(12) United States Patent
Takayama

(10) Patent No.: US 7,240,973 B2
(45) Date of Patent: Jul. 10, 2007

(54) CRAWLER, CRAWLER PIN, CRAWLER BUSH, AND CRAWLER MANUFACTURING METHOD

(75) Inventor: Takemori Takayama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/224,484

(22) Filed: Aug. 21, 2002

(65) Prior Publication Data
US 2003/0111905 A1  Jun. 19, 2003

(30) Foreign Application Priority Data
Aug. 22, 2001 (JP) .............................. 2001-251942
Aug. 2, 2002 (JP) .............................. 2002-226573

(51) Int. Cl.
*B62D 55/205* (2006.01)
(52) U.S. Cl. .................... 305/117; 305/103; 305/203
(58) Field of Classification Search ................ 305/100, 305/103, 117, 118, 202, 203, 59, 201; 384/293
See application file for complete search history.

(56) References Cited

U.S. PATENT DOCUMENTS

| | | | | |
|---|---|---|---|---|
| 57,695 A | * | 9/1866 | Everett | |
| 98,172 A | * | 12/1869 | Lloyd | |
| 425,569 A | * | 4/1890 | Gare | 384/292 |
| 1,557,137 A | * | 10/1925 | Brincil | |
| 3,178,239 A | * | 4/1965 | Zeller | |
| 3,545,831 A | * | 12/1970 | Kopke et al. | |
| 3,841,716 A | * | 10/1974 | Webber et al. | |
| 3,909,087 A | * | 9/1975 | Cairns | 384/293 |
| 4,191,431 A | * | 3/1980 | Roley et al. | |
| 4,199,199 A | * | 4/1980 | Granda | 305/106 |
| 4,307,998 A | * | 12/1981 | Nakayama et al. | 417/269 |
| 4,311,346 A | * | 1/1982 | Danner | 305/103 |
| 4,438,981 A | * | 3/1984 | Harms | 305/118 |
| 4,486,104 A | * | 12/1984 | Vezirian et al. | 384/95 |
| 4,597,456 A | * | 7/1986 | Ecer | 175/371 |
| 4,946,747 A | * | 8/1990 | Bergmann et al. | 428/653 |
| 5,069,509 A | * | 12/1991 | Johnson et al. | |
| 5,094,548 A | * | 3/1992 | Danly, Sr. | 384/30 |
| 5,249,868 A | * | 10/1993 | Watts | 384/276 |
| 5,322,372 A | * | 6/1994 | You | 384/293 |
| 5,412,934 A | * | 5/1995 | Furuyama | 59/78 |
| 5,468,310 A | * | 11/1995 | Fujiki et al. | 148/435 |
| 6,089,843 A | * | 7/2000 | Kondoh | 418/179 |
| 6,206,491 B1 | * | 3/2001 | Hisamatsu | 305/103 |

(Continued)

FOREIGN PATENT DOCUMENTS

JP   2001-88755   4/2001

*Primary Examiner*—Russell D. Stormer
(74) *Attorney, Agent, or Firm*—Posz Law Group PLC; R. Eugene Varndell, Jr.

(57) ABSTRACT

A crawler having a crawler pin and a crawler bush having lubrication between the crawler pin and the crawler bush without lowering the strength of the crawler at the running time, thereby to prevent the creak or seizure, as might otherwise be caused at the running time. A metallic sliding member having an excellent wear resistance can be arranged in the clearance between the crawler bush and the crawler pin. The metallic sliding member can be capable of holding lubricating oil and/or a lubricant. In addition, the clearance between the core bush and the crawler pin can be narrowed, so that the resulting structure retains the imbalance load on both the crawler bush and the crawler pin.

4 Claims, 20 Drawing Sheets

U.S. PATENT DOCUMENTS 6,244,426 B1 * 6/2001 Murano et al. ............. 198/784
6,541,127 B1 * 4/2003 Tomikawa et al. .......... 428/652
6,613,121 B2 * 9/2003 Takayama et al. ............ 75/247

2006/0017323 A1 * 1/2006 Wodrich et al. ............ 305/202
2007/0009757 A1 * 1/2007 Takayama et al. .......... 428/644

* cited by examiner

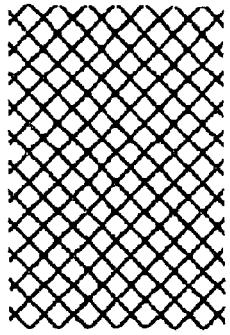
FIG. 2A
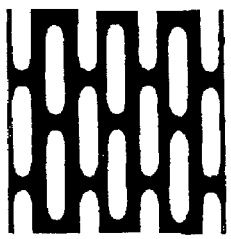
FIG. 2D
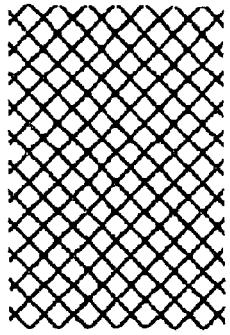
FIG. 2G
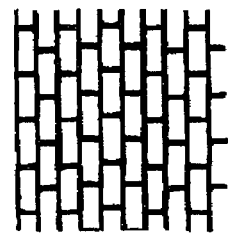
FIG. 2E
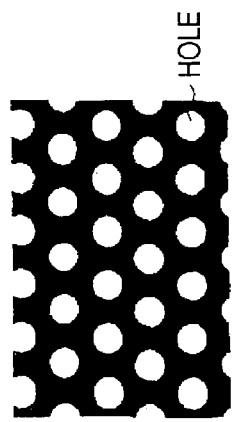
FIG. 2B
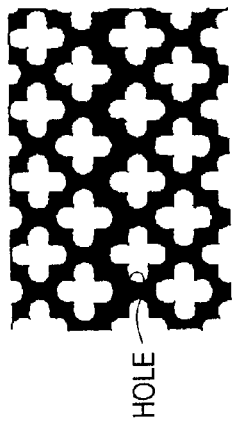
FIG. 2C
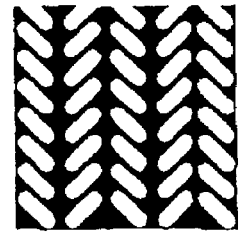
FIG. 2F
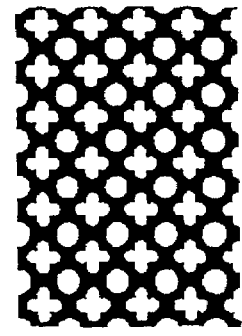

EXPERIMENTAL CONDITIONS

| | |
|---|---|
| MATING MATERIAL | : SGM420 CARBURIZED-QUENCHED SURFACE HARDNESS $H_{RO}$ 60~62 SURFACE ROUGHNESS 2.5S OR LESS |
| LUBRICATING OIL | : EO10, OIL FLOW RATE: 250 cm$^3$/min. |
| OIL TEMPERATURE | : 60°C |
| CIRCUMFERENTIAL SPEED | : 10 m/sec. |
| BEARING PRESSURE | : MAX 800kg/cm$^2$ (EVERY 50kg/cm$^2$) |

SLIDING TEST PIECE HOLDER

FIG. 16A
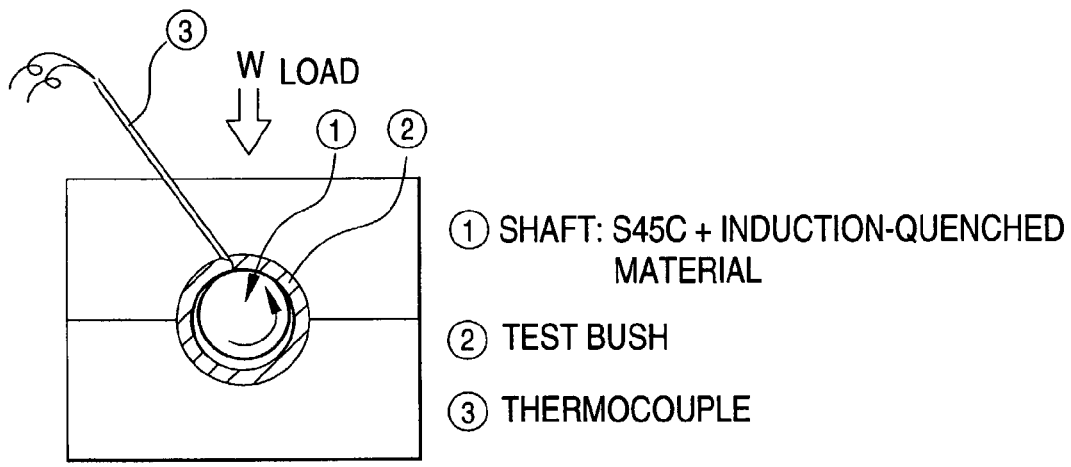
① SHAFT: S45C + INDUCTION-QUENCHED MATERIAL
② TEST BUSH
③ THERMOCOUPLE
FIG. 16B
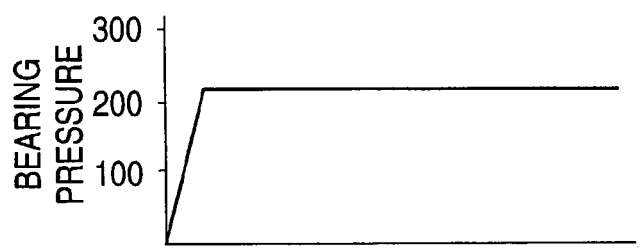
GREASE : LITHIUM GREASE
ANGLE OF OSCILLATION : 180°C
ROTATING SPEED : ±6PRM
BEARING PRESSURE : MAX 1000kg/cm$^2$
MATING SHAFT MATERIAL : S45C + INDUCTION-QUENCHED
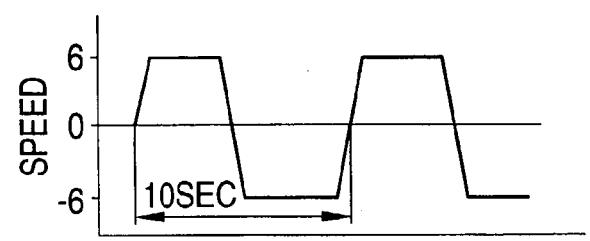

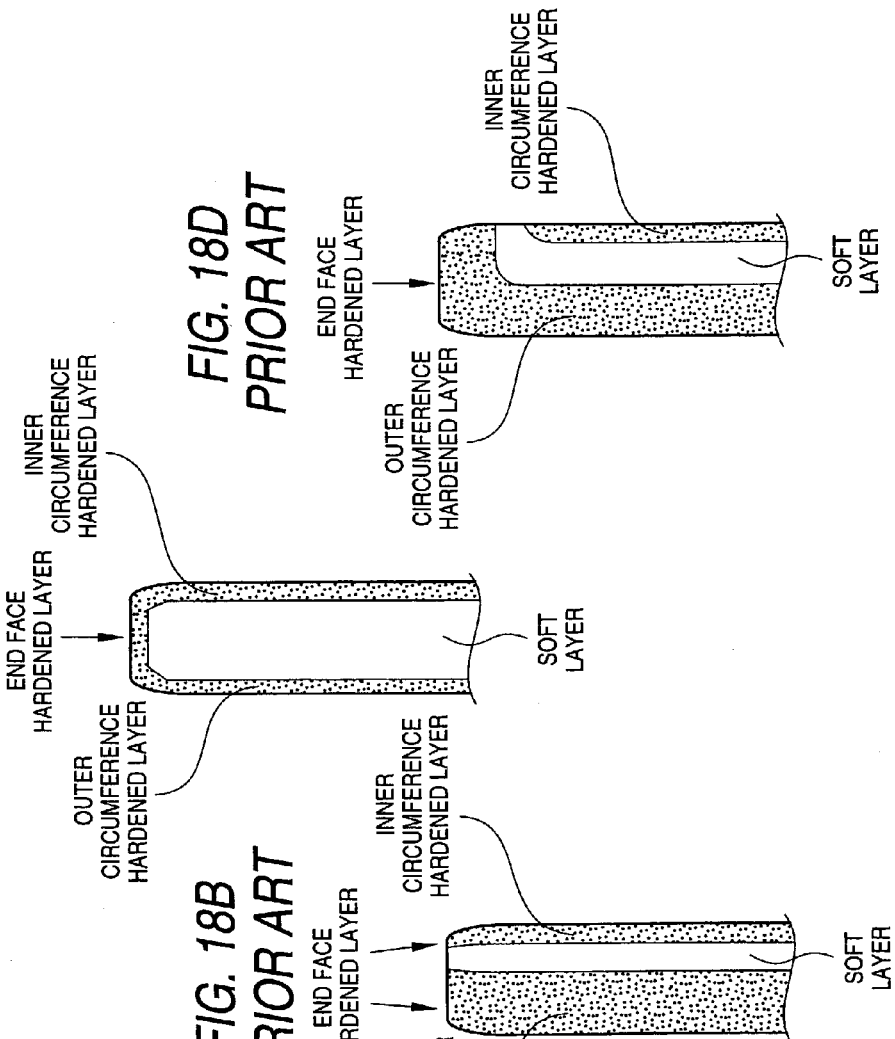

BOUNDARY LUBRICATING WEAR OF COPPER ALLOY AND IRON
H. KRAUSE AND C. HAMMER, WEAR, 93 (1984) 127-143

CRAWLER, CRAWLER PIN, CRAWLER BUSH, AND CRAWLER MANUFACTURING METHOD

BACKGROUND OF THE INVENTION

1. Field of the Invention

The present invention relates to a crawler, a crawler pin, a crawler bush or a crawler manufacturing method, which is to be used in a construction or civil engineering machine such as a excavator or a bulldozer.

2. Related Art

As shown in FIG. 17A, a crawler 50 of a construction machine is generally constructed to include: a crawler shoe 51; a pair of crawler links 52 and 53 fixed on the crawler shoe 51 by means of bolts; a crawler bush 54 press-fitted/fitted in the holes formed in the crawler links 52 and 53; and a crawler pin 55 inserted into the crawler bush 54 and press-fitted/fitted in the holes of the crawler links 52 and 53. As the toothed sprocket of a drive sprocket meshes with the crawler bush 54 press-fitted between the crawler links 52 and 53, the crawler 50 turns to run the construction machine. Between the end portions of the crawler bush 54 and the crawler pin 55, as shown in FIG. 17B, there are arranged seal devices 56 for preventing the soil and sand and the muddy water from coming into the clearance between the crawler bush 54 and the crawler pin 55 thereby to improve the wear lifetimes of the inner circumference of the crawler bush 54 and the outer circumference of the crawler pin 55.

Here, the aforementioned crawler bush is hardened at its inner and outer circumferences by the carburizing and quenching method or the induction-quenching method, as shown in FIGS. 18A to 18D. In FIG. 18A, for example, the inner and outer circumferences are induction-quenched to leave a soft layer at the end face, so that this type is used in a later-described dry type crawler. In FIG. 18B, the outer circumference is prominently deepened in its hardness to enlarge the hardened layer width from the outer circumference although the soft layer appears at the end face, so that this type is used in the later-described wet type crawler 50, too. In FIG. 18C, the inner and outer circumferences and the end face surfaces are continuously hardened by the carburizing and quenching method so that this type is used in the later-described wet type crawler, too. In FIG. 18D, after the entirety was hardened by quenching it, the inner circumference is induction-quenched to form a deep hardened layer on the outer circumference and on the surface of the end face, and a tempered soft layer leading to the inner circumference and a shallow inner circumference hardened layer are formed, so that this type is used in the later-described wet type crawler, too. In the crawler pin, moreover, the outer circumference is hardened by a similar heat treatment to improve the strength and the wear resistance of the crawler.

In the portions at the running drive sprocket and the idler wheel, on the other hand, rotations in the circumferential direction of the crawler bush 54 and the crawler pin 55 occur between the crawler bush 54 and the crawler pin 55 inserted into the inner circumference of the crawler bush 54, so that unusual noises (or uncomfortable sounds) such as creaks or seizure noises are easily made while the bush 54 and the pin 55 are sliding in contact (or in the sliding contact state). In order to prevent the crawler bush and the crawler pin from being lowered in strength by the unusual noises or the seizures, an adjustment is made to make the external diameter of the crawler pin smaller than the internal diameter of the crawler bush.

In the bulldozer to run at a high speed, moreover, there is used the wet type crawler which has lubricating oil confined between the crawler bush and the crawler pin, to suppress the aforementioned uncomfortable sounds and to prevent the seizure between the crawler pin and the crawler bush. However, this wet type crawler structure takes a high price. In the crawler such as one for the hydraulic shovel having little necessity for a high-speed run, therefore, there is generally used the dry type crawler which has no lubricating oil confined.

In the aforementioned construction machine, it is known that an extremely high unbalanced load acts on the crawler pin and the crawler bush of the crawler, no matter whether the crawler might be dry or wet. A load of the body weight (W) or higher frequently acts on a set of crawler pin and crawler bush, and the load may rise to three times (3W) or more when the construction machine rides over a hard obstacle.

At the portion, to which the unbalanced load is easily applied, the clearance between the crawler bush and the crawler pin is important. From the viewpoint of strength, it is preferred to narrow that clearance thereby to support the unbalanced load by both the crawler bush and the crawler pin. In case a slippage occurs between the crawler bush and the crawler pin, as described hereinbefore, there easily occurs the problem of seizure, namely, a breakage from the inner circumference of the crawler bush. With a larger clearance between the crawler bush and the crawler pin, moreover, the problem of the seizure is naturally lightened, but there arise other problems that the crawler bush is easily broken and that the crawler bush has to be more large-sized for reinforcing the crawler bush.

From these viewpoints, in most cases, the clearance between the crawler bush and the crawler pin is set between 0.4 to 1.2 mm in terms of the diametrical difference. In case the unbalanced load is raised when the excavator runs continuously on rough surfaces or when the bulldozer runs at a high speed, however, there arise problems that the seizure cannot be avoided, as schematically shown in FIG. 19, and that the crawler bush is frequently broken when the clearance between the two is large.

Especially, the contact portion by the unbalanced load takes a high bearing pressure and an extremely low sliding speed and is used under the reciprocating conditions. In the wet type crawler containing the lubricating oil, therefore, the seizure easily occurs, and the oil seal may be broken by the overheat to cause leakage of the lubricating oil. Another problem is that the crawler bush and the crawler pin are broken at the seized portion.

As a countermeasure for this seizure phenomenon, on the other hand, the crawler pin and the crawler bush are prominently hardened on their sliding faces by the induction-quenching method or the carburizing and quenching method. As another countermeasure, it is conceivable to coat the surface of the crawler pin and the inner circumference of the crawler bush with a phosphate film, a carbide, a nitride or a super-hard solid lubricant (e.g., $MOS_2$ or graphite). However, it is difficult to form those surface improving layers thick (e.g., about 10 microns). This difficulty fails to lead to a sufficient improvement in the lifetime and causes another problem of a high cost.

In the wet type crawler containing the lubricating oil, on the other hand, an oil hole is formed in the crawler pin so that it can feed the lubricating oil preferentially to the positions, to which the unbalanced load is easily applied, as shown in FIG. 19. However, it deteriorates the crawler pin strength to form the oil hole at the positions of the maximum unbalanced load of the crawler pin. From the viewpoint of raising the strength of the crawler, an undesired problem is left such as breaking the crawler pin.

Here, Unexamined Published Japanese Patent Application No. 2001-88755 has been disclosed with a view to minimizing the wears of the inner circumference of the crawler bush and the outer circumference of the crawler pin, thereby to improve the durability and lifetime of the crawler even when the soil and sand come into the clearance between the crawler bush and the crawler pin. In this Application it has been disclosed to provide: 1) a crawler having a structure, in which a plurality of foreign substance trapping grooves extending axially while being circumferentially spaced are formed in the inner circumference of a crawler bush; 2) a crawler having a structure, in which a resin layer made of a hard resin material is formed on the inner circumference of a crawler bush and in which a plurality of foreign substance trapping grooves extending axially while being circumferentially spaced are formed in the resin layer; and 3) a crawler having a structure, in which sliding elements made of a hard resin material are disposed on the inner circumference of a crawler bush and in a plurality of foreign substance trapping grooves extending axially while being circumferentially spaced, so that a crawler pin is slidably supported by the sliding elements, and in which a plurality of space portions are formed between the inner circumference of the crawler bush and the outer circumference of the crawler pin while being circumferentially spaced.

In that Application, moreover, it has been disclosed to use an ultra-high-molecular-weight polyethylene resin excellent in the sliding characteristics as the aforementioned hard resin material and to fill and use the aforementioned plurality of foreign substance trapping grooves and space portions with grease for lubricating the clearance between the crawler bush and the crawler pin.

In the crawler bush which is provided with the plurality of foreign substance trapping grooves extending axially while being circumferentially spaced of the aforementioned crawler bush inner circumference, however, the trapping grooves are parallel to the progressing direction of the annularly crushing breakage of the crawler bush due to the aforementioned unbalanced load and are the sources for a serious stress concentration so that the breaking strength is extremely lowered.

In case a load of 1 W or higher is applied to one crawler bush, as described hereinbefore, the pressure to be applied to the hard resin layer of the crawler bush becomes excessive. This resin layer does not have sufficient hardness or strength so that the crawler bush cannot prevent its setting. The resin layer, as squeezed out by the setting, may deteriorate the sealability of the seal devices of the crawler. Moreover, the crawler bush is seriously worn under a high bearing pressure by the slippage from the crawler pin, and the resin layer itself hardly contributes to the improvement in the strength of the crawler bush, thereby to raise a problem that the strength of the crawler bush is lowered by the thickness of the resin layer. It is, therefore, desired to design a compact crawler while making the crawler bush as small as possible.

The present invention has been conceived in view of the problems thus far described and has an object to provide a crawler, a crawler pin, a crawler bush and a crawler manufacturing method, which can improve the lubrication between the crawler bush and the crawler pin without lowering the crawler strength at the running time, thereby to prevent the creak or seizure, as might otherwise be caused at the running time. More specifically, the object of the invention is to provide a crawler, a crawler pin, a crawler bush and a crawler manufacturing method, which are made silent and excellent in high strength and wear resistance, by arranging a metallic sliding member of an excellent wear resistance in the clearance formed between the crawler bush and the crawler pin to prevent the crawler bush through the metallic sliding member from being broken by the reaction from the crawler pin in sliding contact against the breaking stress on the inner circumference of the crawler bush at the running time, by preventing the creak and the seizure noise, as might otherwise be caused by the sliding contact between the crawler bush and the crawler pin at the running time, and by absorbing the hammering noise which is caused at the time of meshing with the sprocket.

SUMMARY OF THE INVENTION

In order to solve the aforementioned problems, according to a first aspect of the invention, there is provided a crawler comprising: a cylindrical crawler bush surface-hardened on its outer circumference or on its outer circumference and its inner circumference; a crawler pin arranged on the inner circumference of said crawler bush; and a metal member formed of at least one layer arranged between the clearance formed between said crawler bush and said crawler pin, wherein said at least one layer of said metal member is a metallic sliding member having a structure capable of holding lubricating oil and/or a lubricant.

In the clearance formed between the crawler bush and the crawler pin, according to the invention, there is arranged the metallic sliding member which has a structure capable of holding the lubricating oil and/or the lubricant. At the portions to be subjected to the unbalanced load, the clearance between the crawler bush and the crawler pin is narrowed so that a higher crawler strength than that of the prior art can be retained by supporting the unbalanced load on both the crawler bush and the crawler pin. At the same time, the gall or seizure between the crawler pin and the crawler bush under a high load can be prevented to prevent the unusual noises.

More specifically, the clearance between the crawler bush and the crawler pin is usually set within a range of 0.4 to 1.2 mm in terms of the diametric difference. When the aforementioned unbalanced load increases, there arise the problem that the occurrence of the seizure cannot be avoided, and the problem that the crawler bush breaks the more frequently for the larger clearance. In the invention, the metallic sliding member having an excellent seizure resistance is interposed between the crawler bush and the crawler pin so that the seizure is prevented. Moreover, the deformation on the crawler bush inner circumference under the unbalanced load is relaxed by the metallic sliding member to contact with the inner circumference so that the crawler bush can be prevented from breaking.

On the other hand, the hammering noises to occur at the meshing time between the crawler bush and the sprocket are absorbed by the vibrations of the metallic sliding member inscribing the crawler bush so that an excellently silent crawler can be provided. In order to enhance this sound absorptivity, a plurality of layers of metallic sliding members or the metallic sliding member and one or more layers of damping material are integrated with the crawler bush inner circumference by the press-fitting, caulking or adhering method. It is then apparent that the sound absorbing effect can be enhanced by the vibrations or small slippage between the metallic sliding members or between the metallic sliding member and the damping material.

In case the plurality of layers of the metallic sliding member are integrated with the crawler bush inner circumference, it is apparent that a highly damping metallic material having no excellent sliding characteristics can be used on the non-sliding side of the crawler bush inner circumference although the metallic sliding member is essential on the side to slide with the crawler pin.

Especially in the dry type crawler, the lubrication of the metallic sliding member can be highly enhanced by using the metallic sliding member having a structure capable of storing the lubricant such as the lubricating oil or grease. It is also apparent that the structure capable of storing the lubricant such as the lubricating oil or grease for a long time is preferred for making the improvement effective for a long time.

In (a second aspect of) the invention, said crawler bush may include: stationary bushes press-fitted in said crawler link; and a rotary bush to mesh by the teeth of a drive sprocket, and said metal member may be arranged between said stationary bushes and/or said rotary bush and said crawler pin. According to this crawler bush, it is advantageous that the torsional rigidities of the right and left crawler links can be sufficiently retained, and that the disadvantage of the wear of the crawler bush outer circumference to mesh with the teeth of the drive sprocket can be avoided by using the rotary bush.

In (a third aspect) of the invention, it is effective for retaining the homogeneous lubrication and the long-term lubrication on the sliding face and preferable for enhancing the sound absorption of the metallic sliding member that said metallic sliding member is holed to hold the lubricant therein. More specifically, it is preferred to use the thin metallic sliding member having a cylindrical shape and a variety of holes or a rounded sheet metallic sliding member having a variety of holes. Especially from the viewpoint of the cost, it is preferable to round a variety of sheet-shaped metal member called the "punched metal" into a cylindrical shape. From the viewpoint of the sliding characteristics, a copper type material such as bronze or brass is preferable. On the other hand, the lubricant to fill the aforementioned holes is preferred to have a low Young's modulus and/or porous characteristics for excellent sound absorbing characteristics. The preferred lubricant is exemplified by graphite, hard wax, plastics or oil-containing plastics.

In (a fourth aspect of) the invention, it is preferred that said metallic sliding member is made of a metallic sintered sliding material having 5 to 30 volume % of pores, which are impregnated with the lubricating oil, to enhance the damping effect. Thus, the metallic sliding member having the structure capable of storing the lubricant such as the lubricating oil and/or the grease can be exemplified by the metallic sintered sliding material, in which the pores are homogeneously dispersed to contain the lubricating oil thereby to improve the lubrication and the sound absorption on the sliding face. Here, the porosity of the metallic sintered sliding material is made to have the individual pores opened and may be set at 5 volume % or more necessary for smoothing the movement of the lubricating oil in the sintered body and 30 volume % or less from the viewpoint of the strength of the metallic sintered member.

However, this metallic sintered sliding material need not always have the aforementioned pores of various shapes. In order to contain the grease or another solid lubricant, however, it is preferred to hole the thin porous metallic sintered member of a cylindrical shape or to round the sheet-shaped porous metal sintered sliding member having the various holes.

Here, the porous copper type sintered sliding material has a Young's modules about one half or smaller than that of the steel so that it plays an important role to reduce the stress of contact with the crawler pin and the crawler bush prominently when deformed by the stress of the unbalanced load, and to reduce the easy seizure. At the same time, the material is chemically hard to seize the crawler bush or the crawler pin made of steel and is best known as the material type to be used as the sliding material for steel. Thus, this material is the most suitable one in the invention.

In the fourth aspect, it is preferable (in a fifth aspect of the invention) that a lubricating oil storing hole is formed axially of the center portion of said crawler pin, and a lubricating oil feeding hole is formed radially of the same, so that the lubricating oil to be consumed during use can be fed through the pores of these lubricating oil storing hole and lubricating oil feeding hole into said metallic sintered sliding member. In the second to fourth aspects, moreover, it is preferable (in a sixth aspect of the invention) that said crawler pin outer circumference or said crawler bush inner circumference is grooved, and said metallic sliding member to be used is shaped to have a contour along the groove shape, so that the metallic sliding member is prevented from axially coming out from the clearance formed between the crawler bush and the crawler pin when the crawler runs. Moreover, it is preferable (in a seventh aspect of the invention) that in order to prevent said metallic sliding member from axially moving, the side faces of the crawler link, on which the two ends of said crawler pin are press-fitted, act as stoppers.

Moreover, it is preferable (in an eighth aspect of the invention) that said metallic sliding member is either press-fitted or fitted on said crawler bush inner circumference or fitted on said crawler pin outer circumference. Here, it is preferable (in a ninth aspect of the invention) that seal devices are mounted on the inner circumference near the two ends of the crawler in which said metallic sliding member is press-fitted or fitted in said crawler bush inner circumference.

In the aforementioned individual aspects, moreover, it is preferable (in a tenth aspect of the invention) the clearance formed between said crawler bush and the crawler pin arranged on the inner circumference of said crawler bush is set to 0.4 to 2.2 mm in terms of their diametrical difference, and the metallic sliding member having a thickness of 0.1 to 1.0 mm is arranged in said clearance, so that the whole clearance is reduced to 1.0 mm or less in terms of the diametrical difference. In this case, it is preferable (in an eleventh aspect of the invention) that said metallic sliding member is a copper sintered sliding material having a lower Young's modulus than that of steel and is excellent not only in a seizure resistance but also in a wear resistance and a corrosion resistance.

In case the copper type sliding material to be inserted between the crawler bush and the crawler pin is easily worn, on the other hand, it is anticipated that the worn powder breaks the dust seal or the oil seal. As apparent from the results of the prior art plotted in FIG. 20, therefore, it is apparent that either the copper type sliding material or the material having a hardness of Hv130 or higher and excellent in the wear resistance is preferable for the copper type sliding material.

As a representative wear resisting copper type casting material, for example, there are well known a high tensile brass type based on Cu—Zn and an Al-bronze type material based on Cu—Al.

In case the high tensile brass type of those is used as a sintered material capable of containing the oil, as described above, Zn is extremely liable to evaporate in the sintering course. On the other hand, the Al-bronze type is caused by Al to exhibit an abnormal expansion at the sintering time. This raises a difficult problem for the sliding material to achieve the sufficient strength and hardness.

In the invention, therefore, it is preferable (in a twelfth aspect of the invention) that said copper sintered sliding material is the Cu—Al—Ti type sintered sliding material which is prepared by compression-molding and sintering the mixed powder for the copper sintered material, as containing essentially 5 to 12 weight % of Al and 0.3 to 5 weight % of Ti, and by repeating the step of re-compressing and re-sintering the sintered material obtained, one or more times. It is also preferable (in a thirteenth aspect of the invention) that said copper sintered sliding material is the Cu—Al—Sn type sintered sliding material which contains 5 to 12 weight % of Al, 3 to 6 weight % of Sn, and at least 0.5 to 5.0 weight % of at least one of Ti, Ni, Co, Si, Fe and P.

The aforementioned Cu—Al—Ti type sintered sliding material is abnormally expanded when sintered. In the invention, however, a highly hard sintered material of Hv130 or higher is obtained while retaining the aforementioned porosity, by repeating at least one or more the step of sintering the pressure-molded powder molding once at a temperature of 600° C. or higher and the subsequent step of re-pressure compressing and re-sintering the molding at a temperature of 900° C. or higher.

Moreover, the aforementioned Cu—Al—Sn—Ti type sintered sliding material can be prepared like the Cu—Al—Ti type sintered sliding material, but is enabled by adding Sn to dense the sintered member while suppressing the abnormal expansion phenomenon at the sintering time and achieving the denseness of the sintered member. Without the re-pressure compressing step, therefore, the thin cylindrical sintered member can be manufactured and easily press-fitted for use in the crawler bush inner circumference or the crawler pin outer circumference. In case the thin cylindrical sintered member is press-fitted in the crawler bush inner circumference, the sintered member shorter than the crawler bush is preferably separated into a plurality of pieces before press-fitted. It is further preferable to form a space between the separated thin cylindrical sintered members and to store the lubricant such as the grease in that space.

In case a hard β-phase is caused to appear in the aforementioned Cu—Al—Ti type and Cu—Al—Sn—Ti sintered sliding materials, moreover, the seizure resistance is prominently improved. In the invention, therefore, the fundamental structure is made of either the two (α+β) phases seen in the Cu—Al type status diagram or the cooling material structure from the two (α+β) phases, and the hard particles proper for them and a solid lubricant such as graphite are dispersed in the structure.

Specifically in the aforementioned twelve and thirteen aspects, it is preferable (in a fourteenth aspect of the invention) that said copper sintered sliding material has a structure, in which at least hard β-phase, α-phase and β-phase coexist in the sintered structure and in which the sintered structure has a hardness of Hv130 or higher. Here, it is preferable (in a fifteenth aspect of the invention) that a solid lubricant material such as graphite or $CaF_2$ is dispersed in said copper sintered sliding material within a range of 5 weight % or less.

[Influences of Al]

The Al is a main alloy element for the appearance of the β-phase. 12 weight % or more of Al changes the whole alloy into the β-phase to cause a problem that the sintered alloy easily becomes fragile when re-worked. 5 weight % or less of Al makes the β-phase hard to appear so that the aforementioned hardness of Hv130 or higher is hardly achieved. Therefore, the amount of addition of Al is set to 5 to 12 weight %. When the Al powder and the copper powder are molded, moreover, the molding strength is remarkably high, which is preferable. However, the prominent expansion is exhibited at the sintering time so that the material cannot have the aforementioned hardness of Hv130. However, the hardness can be enhanced by the re-compressing treatment after the sintering operation and by the re-sintering treatment. In the invention, therefore, the re-compressing treatment and the re-sintering treatment are repeated by one step or more so that the porosity after the re-sintering treatment is controlled by adjusting the working extent at the final re-compressing treatment.

By adding 0.3 weight % or more of Ti in addition, to the Cu and Al powders, moreover, the sintered sliding material is prominently hardened so that the target hardness can be obtained at one re-compressing treatment and re-sintering step. For this remarkable effect, the amount of addition of Ti is set to 0.3 weight % or more. On the other hand, 5 weight % is set as the upper limit because with more than 5 weight %, a fragile intermetallic compound phase precipitates in a large amount and because the material itself is expensive.

Moreover, the prominent hardness of Ti or the like is thought to come from the precipitation hardness with Al. It is, therefore, preferable that Mn, Ni or Co exhibiting similar actions is added within that range.

[Influences of Sn]

In case Sn is added to Cu—Al, the large content of Al invites a tendency for Sn to be discharged from the sintered member so that the sintered member becomes more porous and prominently expansive. In this case, therefore, the Al is reduced to 7 weight % or less or added together with Ti so that the denseness and the hardness can be easily attained by suppressing the discharge of Sn. On the other hand, the addition of Sn lowers the sintering temperature and stabilizes the β-phase for easy precipitation so that the addition of Al for the appearance of the β-phase can be reduced to improve the sintering properties effectively. The addition of Sn is more effective for the seizure resistance so that the invention has clarified that the Cu—Al—Sn—Ti type alloy sintered material is best desired.

Moreover, the Cu—Al—Sn—Ti type alloy sintered material can be easily densified by the sintering treatment so that it is featured by requiring neither the re-pressure compressing treatment nor the re-sintering step unlike the aforementioned Cu—Al—Ti type sintered material.

[Influences of Graphite or Other Additives]

As the aforementioned Cu—Al—Ti type and Cu—Al—Sn—Ti type sintered sliding materials, it is sufficient to add another alloy element contained in the prior art copper type sintered sliding material such as P, Zn, Fe, Ni, Co, Mn, Pb, Mo, W, Mg or Ag, and/or WC, graphite or ceramics in the aforementioned range of no functional problem. Of these, graphite enhances, when exists with Ti, the joint to the aforementioned Cu—Al—Ti type and Cu—Al—Sn—Ti type sintered material is enhanced so that it is remarkably effective not only as the solid lubricant but also as a place for containing the lubricating oil. Moreover, the graphite has remarkably high slipping properties to flow plastically in the metallic phase so that it is effectively used for retaining the pores in the situations where the pores in the sliding face are easily clogged.

Here, the average particle diameter of the graphite dispersed particles to be added is preferably as large as about 0.05 to 0.3 mm for preventing the aforementioned clogging, and the amount of graphite to be added is considered proper to be 5 weight % or less from the point of the strength of the sintered material.

Here in the invention, the aforementioned metallic sliding member can achieve its function so long as it is inserted into the clearance between the crawler bush and the crawler pin, so that its material needs to be neither press-fitted or fitted on the inner circumference of the crawler bush nor fitted on the crawler pin outer circumference. However, the crawler at the running time is subjected to a slight axial thrust force between the crawler pin and the crawler bush, and the axially releasing force may also act on the aforementioned metallic sliding member. In order to achieve the conveniences at the crawler assembling time, it is preferable that those materials are press-fitted or fitted on the inner circumference of the crawler bush or fitted on the crawler pin outer circumference.

Moreover, either the central portion of the crawler pin outer circumference or the central portion of the crawler bush inner circumference, where the maximum stress due to the unbalanced load is hardly applied, is preferably grooved to work the metallic sliding member in a shape contouring the groove shape, thereby to prevent the metallic sliding member from coming out by the thrust force in the groove or to receive the thrust on the crawler link side faces press-fitting the crawler pin.

In the invention, moreover, the structure is made such that (oil) seal devices such as lip seals are arranged in the two end faces of the crawler bush to seal on the crawler pin outer circumference thereby to enhance the long-term holdability of the aforementioned grease or lubricating oil and to improve the wear lifetime of the crawler bush, as might otherwise be shortened by the soil and sand or the muddy water coming from the outside.

Especially in the dry type crawler of the prior art, the muddy water easily comes into the clearance between the crawler bush and the crawler pin when the crawler runs on the mud land or muddy land such as rice fields, and the lifetime of the crawler is easily shortened by the wears of the crawler bush inner circumference and the crawler pin surface. In order to elongate the lifetime of the crawler, therefore, it is frequent to use the expensive wet type crawler. In the invention, however, the wear between the crawler bush inner circumference and the crawler pin surface is lightened by inserting the metallic sliding member into the clearance between the crawler bush and the crawler pin to reduce the clearance to be attacked by the aforementioned mud or muddy water and/or by making the metallic sliding member of a structure capable of containing water-repellent lubricating oil.

In the invention, moreover, the crawler can be repaired for reuse not by replacing the expensive crawler bush or crawler pin but by replacing the inexpensive metallic sliding member.

Moreover, it is apparent that the clearance to be formed between the crawler bush and the crawler pin arranged on the side of the inner circumference of the former is desirably set to the maximum size that can be allowed from the aforementioned breakableness of the crawler bush. In the invention, their clearance is set to 0.4 to 2.2 mm in terms of the diametrical difference. In this clearance, there is arranged the metallic sliding member of the structure having a thickness of 0.1 to 11.0 mm and capable of storing the lubricant such as the lubricating oil or grease. The remaining clearance of the difference of the clearance between the crawler bush and the crawler pin from the thickness of the metallic sliding member is reduced to 1.0 (0.4) mm or less in terms of the diametrical difference.

In the invention, moreover, the crawler pin and the crawler bush are defined together with the crawler manufacturing method by the following aspects. In the multi-layered crawler pin constructing any of the crawlers of the first to fifteenth aspects, (according to a sixteenth aspect of the invention), the metallic sliding member having a structure, in which at least its outer circumference is hardened to HRC50 or higher and which has at least one layer on its outer circumference for storing lubricating oil and/or a lubricant, is integrated by caulking, press-fitting or adhering it.

In the multi-layered crawler bush for constructing the crawler of any of the first to fifteenth aspects, (in a seventeenth aspect of the invention), the metallic sliding member having a structure, in which at least its outer circumference is hardened to HRC50 or higher and which has at least one layer on its inner circumference for storing lubricating oil and/or a lubricant, is integrated by caulking, press-fitting or adhering it.

In the aforementioned seventeenth aspect, it is preferable (in an eighteenth aspect of the invention) that the range of the surfaces of the two end faces within a range of a distance of one half-or more of the thickness at least from the outer circumference is hardened to HRC50 or higher. Moreover, it is preferable (in a nineteenth aspect of the invention) that seal devices are mounted in the inner circumference on the end faces.

In the method for manufacturing the crawler of any of the first to fifteenth aspects, (in a twentie aspect of the invention), the metallic sliding member having a structure, in which at least the outer circumference of said crawler bush is hardened to HRC50 or higher, or in which the range of the surfaces of the two end faces within a range of a distance of one half or more of the thickness from the outer circumference is hardened to HRC50 or higher, is integrated on the inner circumference of said crawler bush by caulking, press-fitting or adhering it.

In the twentie aspect, it is preferable (in a twenty first aspect of the invention) that a hardened layer of HRC50 or higher is formed on the outer circumference of said crawler bush by induction-heating or quenching said outer circumference, and that the inner circumference of said crawler bush is made to have a structure of at least one kind of soft ferrite, pearlite, Bainite and tempered martensite having lower than HRC50. Here, it is preferable (in a twenty second aspect of the invention) that said crawler bush inner circumference is grooved, that said metallic sliding member is integrated with said groove by caulking, press-fitting or adhering it, and that seal devices are integrated with the inner circumference of the end portions of said crawler bush.

BRIEF DESCRIPTION OF THE DRAWINGS

FIGS. 2A to 2G show examples of a metallic sliding member;

FIGS. 16A and 16B are a conception diagram and test conditions of a test apparatus for the sliding test;

FIGS. 18A to 18D are diagrams showing the heat-treating hardening patterns of crawler bushes;

DETAILED DESCRIPTION OF THE PREFERRED EMBODIMENTS

With reference to the accompanying drawings, here will be described specific embodiments of a crawler, a crawler pin, a crawler bush and a crawler manufacturing method according to the invention.

Figure 1:
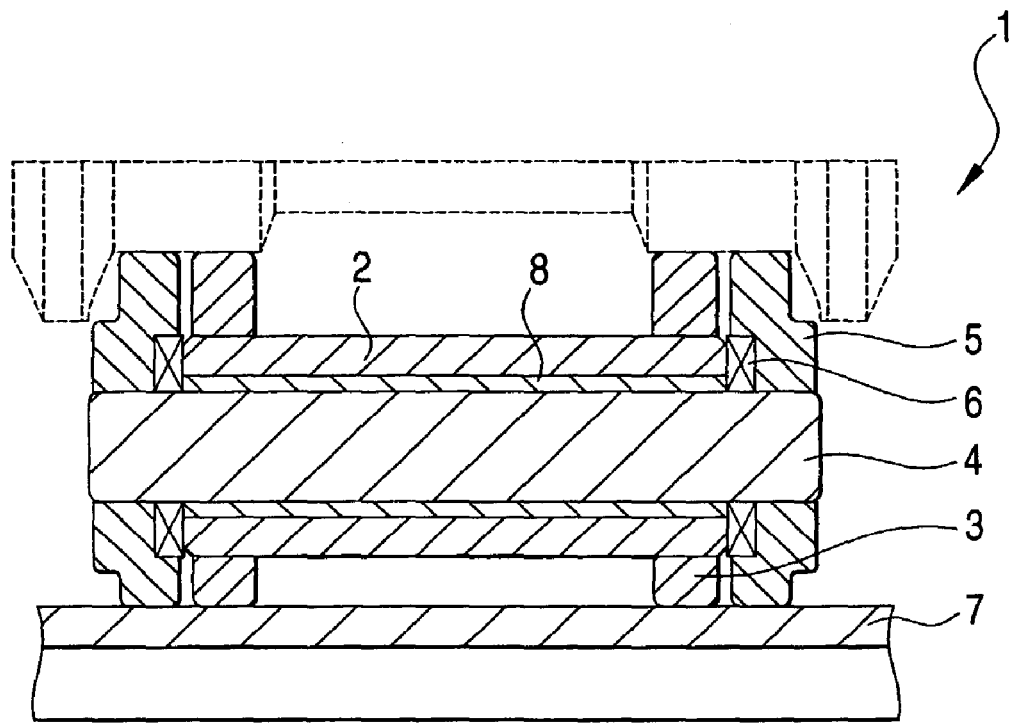
FIG. 1 is a partial, sectional view of a crawler according to one embodiment of the invention.

FIG. 1 is a partial, sectional view of a crawler according to one embodiment of the invention.

In the crawler 1 of this embodiment, a crawler bush 2 is press-fitted at its two ends in a crawler link 3, and a crawler pin 4 is inserted into the inner circumference side of the crawler. bush 2 and is press-fitted at its two ends in a crawler link 5 to connect the crawler links 3 and 5. At the two ends of the crawler bush 2, on the other hand, there are arranged seal devices 6 for preventing the soil and sand from coming from the outside, and the crawler links 3 and 5 are fixed on a crawler shoe 7 by means of bolts so that the crawler 1 is constructed. Between the inner circumference of the crawler bush 2 and the outer circumference of the crawler pin 4, according to this embodiment, there is arranged a metallic sliding member 8 having such a structure as can hold a lubricant such as lubricating oil and/or grease while making the clearance between the inner circumference of the crawler bush 2 and the outer circumference of the crawler pin 4 as compact as possible. By adopting this structure, the crawler pin 4 is also made to share the load (e.g., an unbalanced load or an impacting load) to be applied at the running time of the crawler to the outer circumference of the crawler bush 2, thereby to enhance the fatigue breaking strength at a severer running time and to prevent the seizure, as might otherwise be caused by a slippage (or a sliding contact), between the inner circumference of the crawler bush 2 and the outer circumference of the crawler pin 4.

Here, the aforementioned metallic sliding member 8 may also be enabled, by overlaying, partially jointing or wholly integrating a plurality of layers of the metallic sliding member or the metallic sliding member and a damping material of one or more layers, to enhance the noise absorbing effect more by the vibration and fine slippage between the layers of the metallic sliding member and between the metallic sliding member and the damping material.

The aforementioned bush 2 is made of carbon steel, boron steel or a low alloy steel and is hardened at the surface layers of its inner and outer circumferences by the induction-quenching method or the carburizing and quenching method. As the case may be, moreover, the crawler bush 2 is quenched and hardened for use throughout its thickness by the oil quenching method or the like.

Moreover, the crawler pin 4 is also made of carbon steel, boron steel or low alloy steel and is hardened on its surface layers by hardening its inner and outer circumferences by the surface hardening treatment such as the induction-quenching method, the carburizing and quenching method, the carbonnitriding and quenching method, the nitriding method and the quenching method, so as to enhance its fatigue breaking strength or to improve the resistance to seizure or wear, as might otherwise be caused by the sliding contact with the inner circumference of the crawler bush 2.

In this embodiment, moreover, by arranging the metallic sliding member 8 capable of holding the lubricant such as the lubricating oil and/or the grease, as has been described hereinbefore, the structure can have the oily lubrication and can effectively prevent the seizure, as might otherwise be caused by the slippage (or the sliding contact) between the inner circumference of the crawler bush 2 and the outer circumference of the crawler pin 4. It is also preferred to subject the outer circumference of the crawler pin 4 to a variety of surface treating methods such as the TiN coating method, the sulfurizing and nitriding method, the phosphate coating method or the Cr plating method thereby to improve the seizure resistance at the sliding contact.

In order to attain the structure of the aforementioned metallic sliding member 8 for holding the lubricant such as the lubricating oil and/or the grease, it is preferred as a first method to form holes of various shapes in the metallic sliding member 8. This method can be said to be the preferable one because the holes can be easily machined in the metallic sliding member having a thin cylinder shape and because a sheet-shaped metallic sliding member can be pressed to have the holes of various shapes and bent roundly. Moreover, this method is advantageous in an excellent marketability and a low-cost workability because it can use the so-called "punched metal", as shown in FIGS. 2A to 2G.

It is preferred, as a second method for attaining the structure of the aforementioned metallic sliding member 8 for holding the lubricant such as the lubricating oil and/or the grease, to impregnate a metallic sintered sliding member material having 5 to 30 volume % of pores for retaining a gas permeability, with lubricating oil. This second method is preferable to the first method because it can feed the lubricating oil homogeneously to the whole face to come into sliding contact with. Here, it is further preferable for holding more lubricant or grease to subject the sliding member of this sintered siding material to a holing treatment similar to the aforementioned one.

Figure 3:
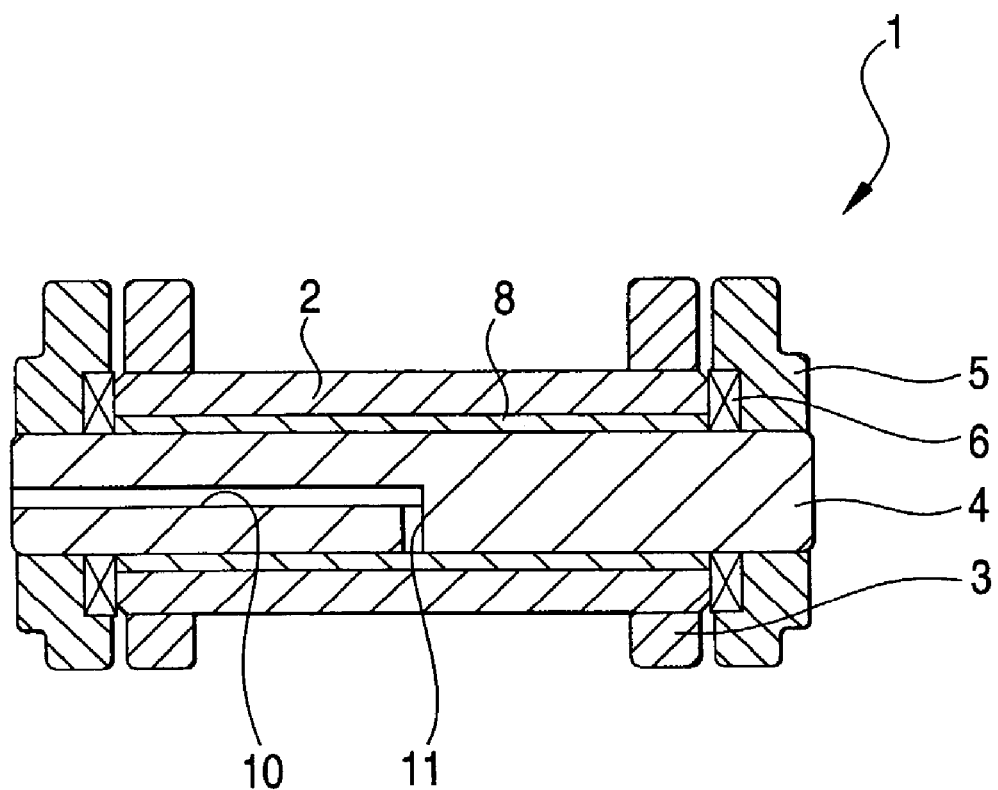
FIG. 3 is a diagram for explaining a lubricating oil feeding method.

In the second method using the sintered sliding material, moreover, as shown in FIG. 3, it is preferred that a lubricating oil storing hole 10 is formed axially of the center portion of the crawler pin 4, and that a lubricating oil feeding hole 11 is formed radially of the same, thereby to feed the lubricating oil to be consumed in the sintered sliding material being used. According to this method, it is possible not only to reduce the lubricating oil storing hole 10 and to lower the cost for holing the sintered siding material but also to prevent the trouble of an easy outflow of the lubricating oil when the seal devices are deteriorated, because the porous sintered sliding material has an ability of storing the lubricating oil.

Here, in order that the metallic sintered sliding material may relax the bearing pressure at the sliding contact and suppress the seizure phenomenon, it is more preferable to be softer than the hard crawler bush 2 or crawler pin 4 to be contacted therewith, to be excellent in toughness against the impacting load at the running time and to make a contact over a wider area than the case in which the crawler bush 2 and the crawler pin 4 contact directly therewith. Therefore, the metallic sintered sliding material is more preferably made of such a copper sliding material as is softer and lower in the Young's modulus than the crawler bush or crawler pin of steel and as is chemically harder to seize steel.

Figure 4A:
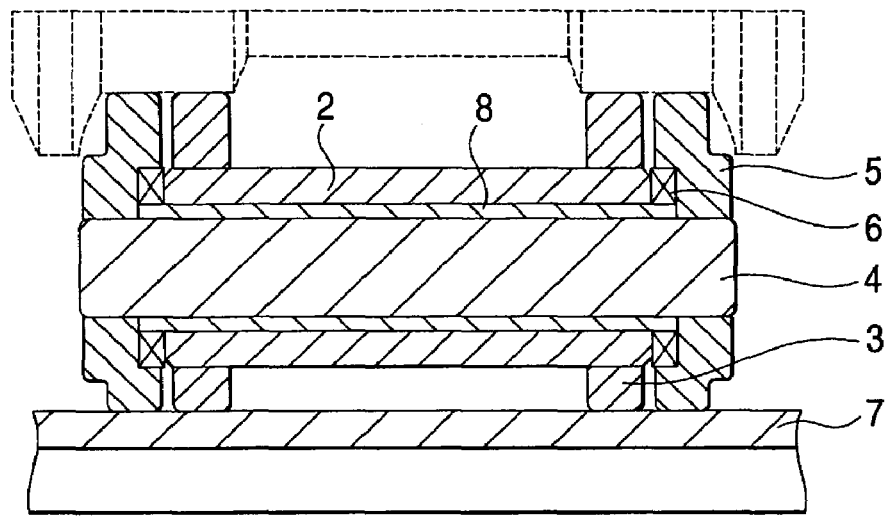
FIGS. 4A and 4B are diagrams for explaining a movement preventing method of the metallic sliding member.
Figure 4B:
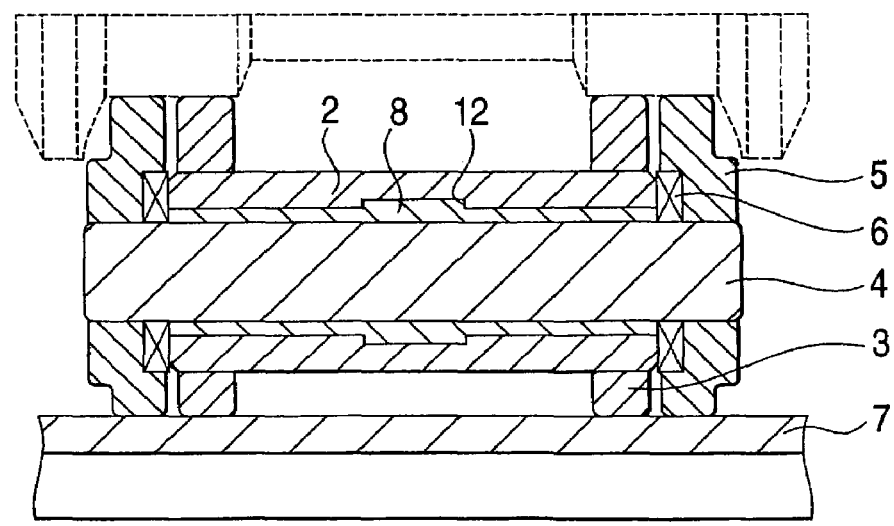

In the metallic sliding member (including a member made of the sintered sliding material), a force is established axially of the crawler bush 2 or the crawler pin 4 at the running time to move the metallic sliding member. As a method for preventing this movement, it is preferred either to adjust the length of the metallic sliding member 8 so that this member 8 may abut at its end faces against the side faces of the crawler link 5 press-fitting the crawler pin 4, as shown in FIG. 4A, or to form a groove 12 circumferentially in the inner circumference of the crawler bush 2 or in the outer circumference (or near its central portion) of the crawler pin 4, as shown in FIG. 4B, and to work the metallic siding member along that groove 12.

Figure 5A:
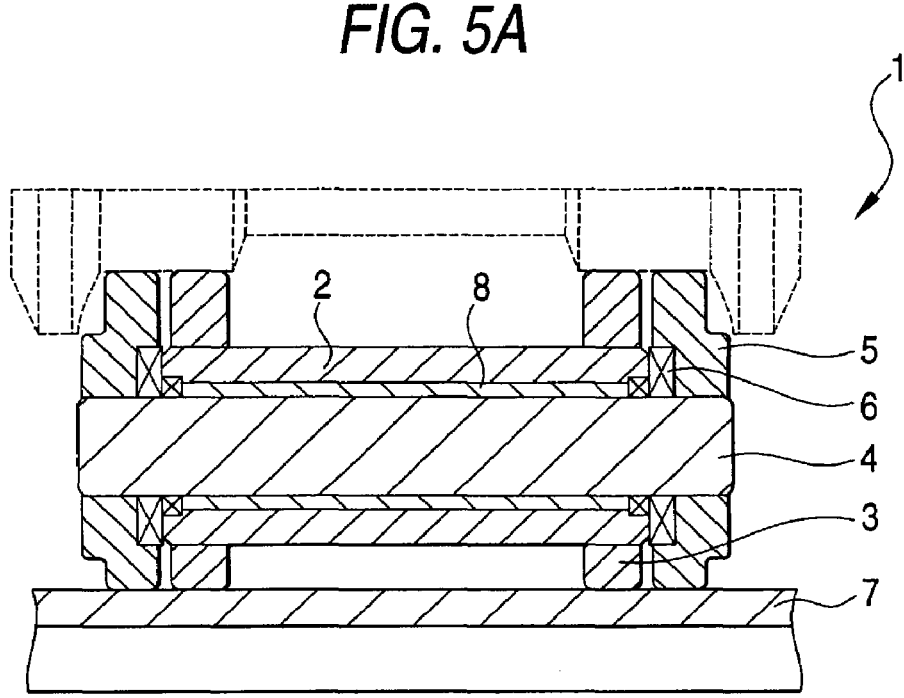
FIGS. 5A and 5B are diagrams showing a structure in which the metallic sliding member is press-fitted or fitted in the inner circumference of a crawler bush.
Figure 5B:
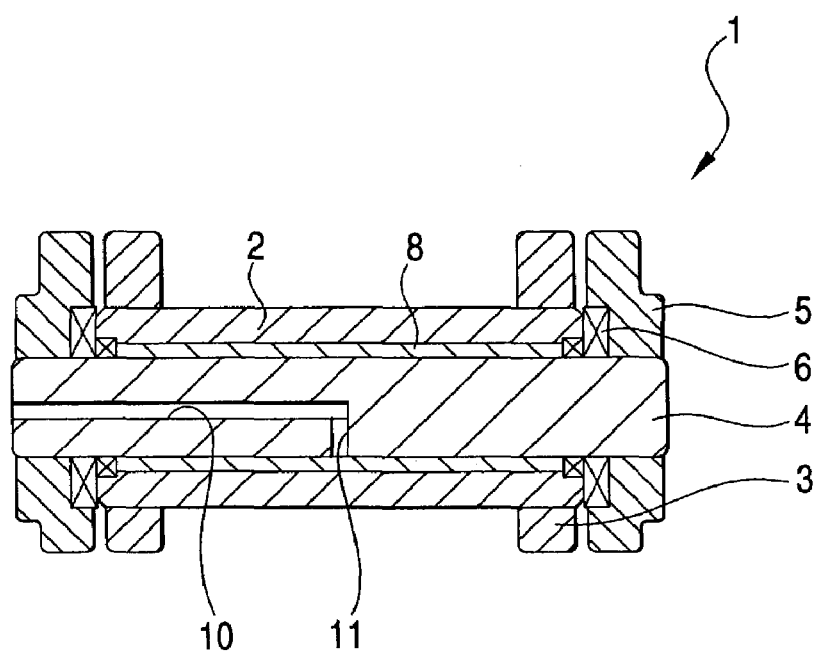
Figure 6A:
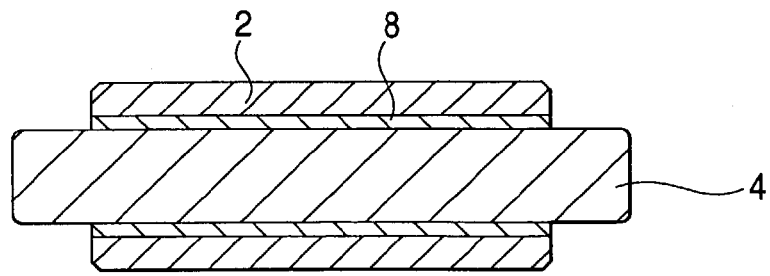
FIGS. 6A to 6D are diagrams showing a groove to be formed in the inner circumference of the crawler bush and a seal device to be disposed at an end face portion.
Figure 6B:
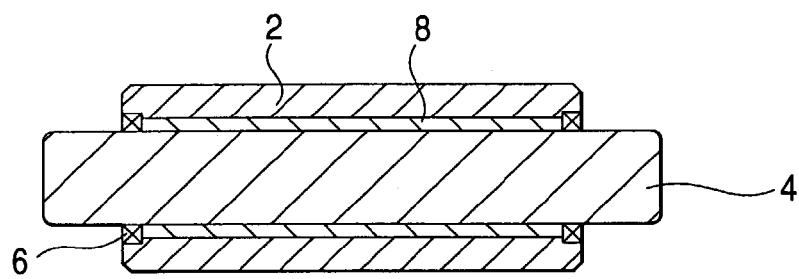
Figure 6C:
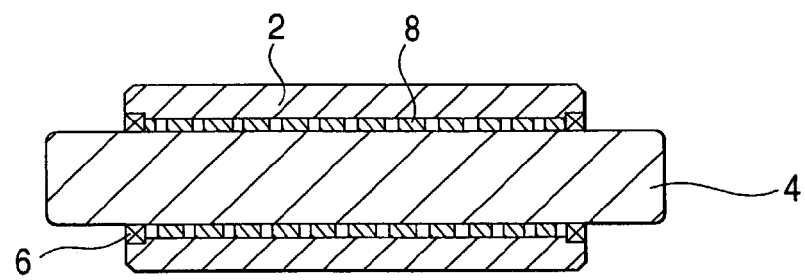
Figure 6D:
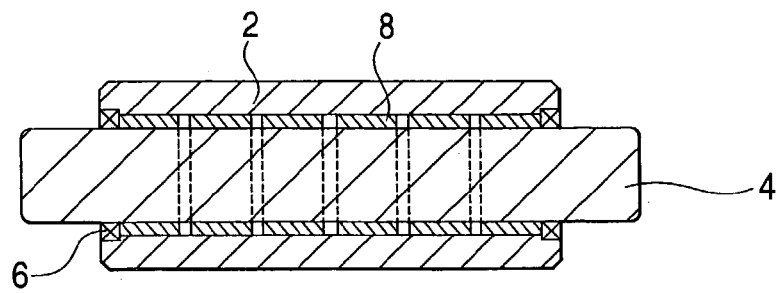

In order to improve the conveniences at the time of assembling the crawler bush 2, the crawler pin 4 and so on, on the other hand, it is preferred to press-fit or fit the metallic sliding member 8 in the inner circumference of the crawler bush 2 or in the outer circumference of the crawler pin 4, as shown in FIG. 5A or 5B.

Moreover, the crawler bush 2 having the metallic sliding member 8 press-fitted or fitted is preferably provided with the convenient seal devices 6 at its two end faces. Then, it is possible to enhance the long storability of the lubricant such as the lubricating oil or grease to be held, and to remarkably enhance the prevention of the soil and sand from coming from the outside thereby to improve the wear resistance of the crawler.

With the aforementioned structures in which the metallic sliding member 8 is inserted into the clearance between the crawler bush 2 and the crawler pin 4 to bear the load on the crawler bush 2 through the metallic sliding member 8 together with the crawler pin 4 thereby to enhance the breakage resistance and to prevent the seizure at the sliding contact and in which the metallic sliding member 8 is press-fitted or fitted in the inner circumference of the crawler bush 2 to eliminate the slide between the crawler bush 2 and the metallic sliding member 8, it is possible to use the crawler bush which need not always be quenched or hardened at its inner circumference. In short, it is possible to use the crawler bush which has the outer circumference hardened layer or the end face surface hardened layer formed merely by induction-quenching it from the outer circumference. Thus, the crawler bush has a prominent advantage over the cost for and the productivity of the heat treatment of the crawler bush of the prior art, as shown in FIGS. 18A to 18D. As shown in FIGS. 6A to 6D, moreover, the groove to be formed in the inner circumference of the crawler bush 2 or the inner circumference working for the seal devices to be disposed at the end faces can be easily done on the crawler bush which has been induction-quenched at its outer circumference. This easy working is remarkably preferable for retaining the machining precision for press-fitting or fitting the aforementioned metallic sliding member. Moreover, the metallic sliding member 8 can be prevented from coming out of the crawler bush 2 by the groove in the inner circumference of the crawler bush. Therefore, a high manufacturing merit can be obtained because a large force is not needed for fitting the metallic sliding member 8 in the crawler bush 2.

On the other hand, the aforementioned heat-treating technique of the prior art, as shown in FIGS. 18A to 18D, can be applied as one for applying various hardening patterns, as shown in FIGS. 7A to 7D, to the crawler bush. Here, the type of FIG. 7A could also be formed by applying the technique for forming the type of FIG. 18D such that after the entirety was once hardened and quenched, the inner circumference is tempered excepting its portions near the two ends by the induction heat treatment. However, this method needs the two heat treatments so that it is economically disadvantageous.

Figure 7A:
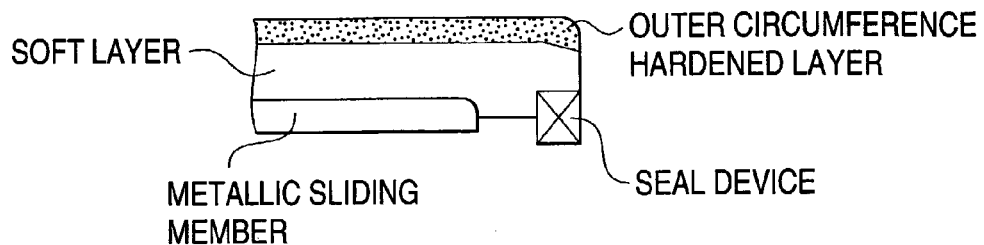
FIGS. 7A to 7D are diagrams showing heat-treating hardening patterns of the crawler bush.
Figure 7B:
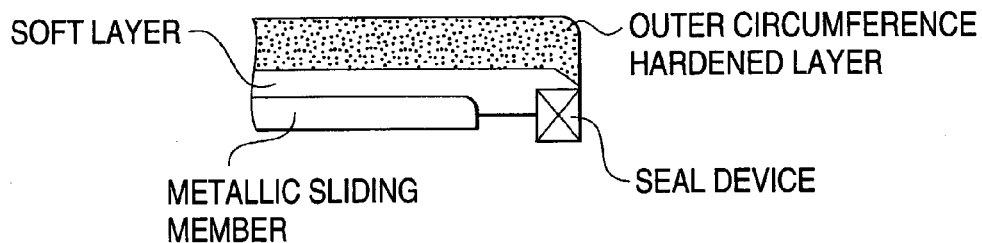
Figure 7C:
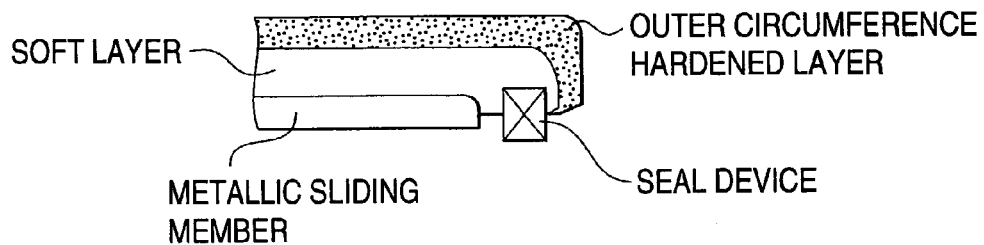
Figure 7D:
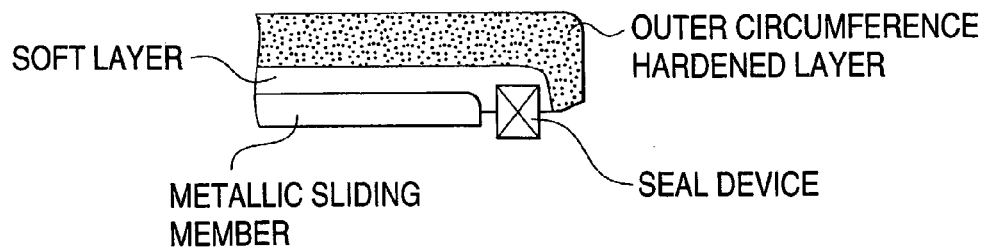

In case the hardened layer need not be formed on the inner circumference of the crawler bush but is formed on the surfaces of the end faces, as in the invention, the hardened pattern of FIG. 7C is preferable because the quenched and hardened layer is formed on the surfaces of the end faces by induction-quenching the outer circumference while moving it and by lowering the heating and feeding speed of the two end faces of the crawler bush. Moreover, the pattern of FIG. 7D having a deeper hardened layer than that of the pattern of FIG. 7C is preferable because it is formed by making the induction heating conditions deeper from the outer circumference and by keeping such a steel component proper as is deeply hardened while being cooled after heated.

Figure 8C:
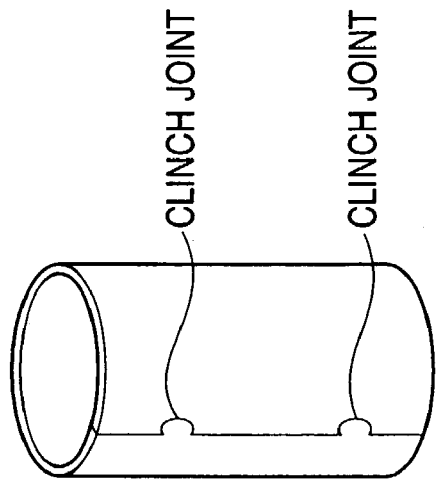
FIGS. 8A to 8C are diagrams for explaining a method for forming the metallic sliding member.
Figure 8B:
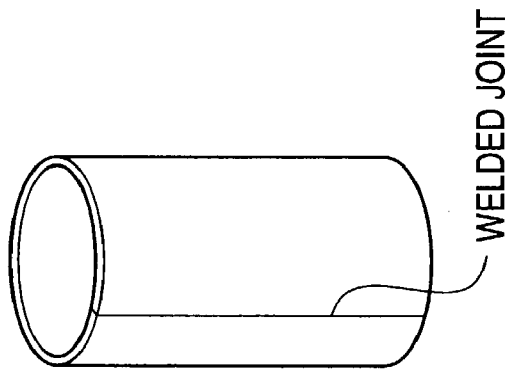
Figure 8A:
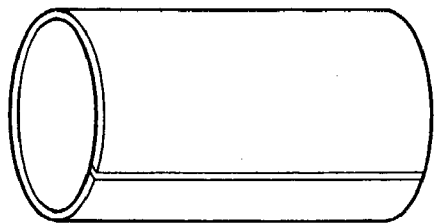

For the methods for press-fitting, fitting and arranging the aforementioned metallic sliding member in the inner circumference of the crawler bush, a variety of methods, as shown in FIGS. 8A to 8C, are applied for forming a cylindrical or generally cylindrical metallic sliding member. In the type of FIG. 8A, the fitting force is established by bringing the end faces of a sheet-shaped sliding member into abutment when this sliding member is rounded into a cylindrical shape and set in the inner circumference of the crawler bush. In the type of FIG. 8B, the sheet-shaped sliding member is rounded into the cylindrical shape and is butt-welded to each other. In the type of FIG. 8C, the sheet-shaped sliding member is rounded at its two end faces and is then clinch-jointed.

In another method of arranging the aforementioned metallic sliding member in the crawler bush having the groove in the inner circumference, it is arbitrary to extend the cylindrical or generally cylindrical metallic sliding member.

Figure 9:
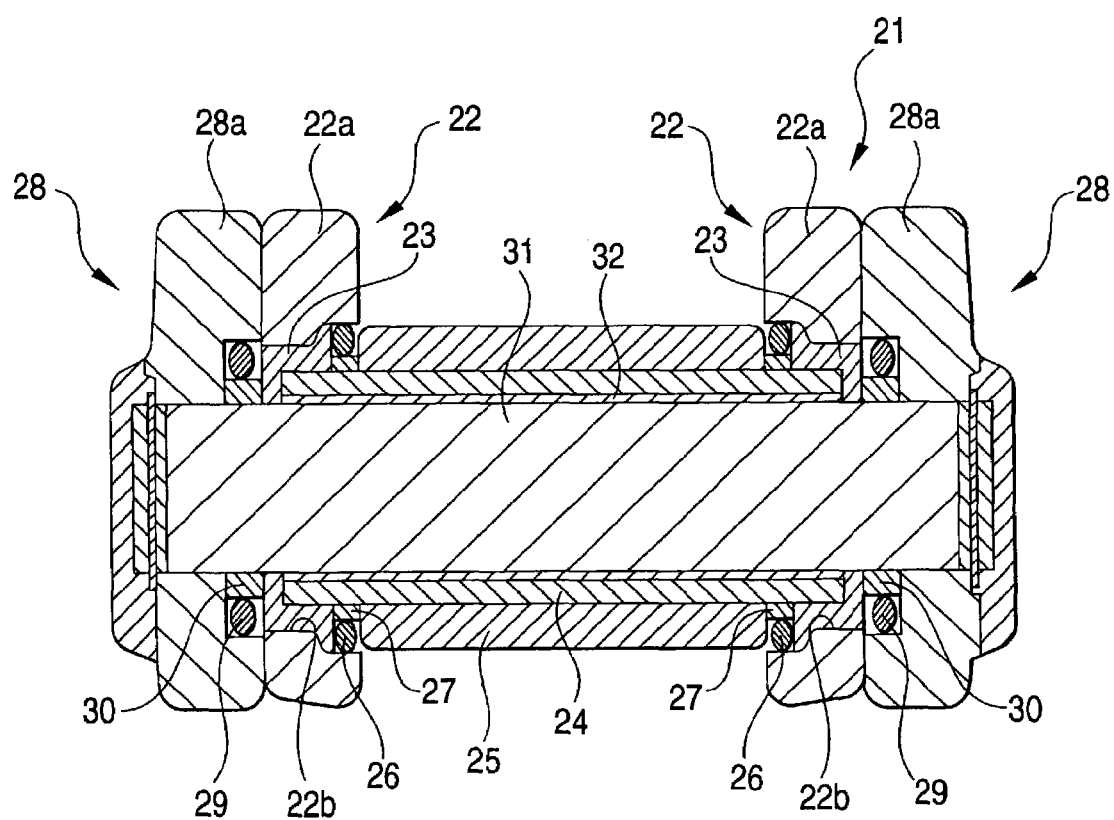
FIG. 9 is a sectional view of a crawler according to another embodiment of the invention.

FIG. 9 is a sectional view showing a crawler according to another embodiment of the invention.

The foregoing embodiment has been described on the structure in which the crawler links are connected by press-fitting the two ends of the crawler pin and the crawler bush in the crawler links. However, another embodiment is applied to a crawler having the structure which is provided with stationary bushes to be press-fitted in the crawler links and a rotary bush to be meshed by the teeth of a drive sprocket and in which the aforementioned metallic sliding member is arranged between the stationary bushes and/or between the rotary bush and the crawler pin.

In a crawler 21 of this embodiment, recessed stationary bushes 23 and 23 are press-fitted at their outer circumferences in joint holes 22b and 22b formed in the inner ends 22a and 22a of crawler links 22 and 22, and a rotary bush 25 is rotatably fitted between crawler links 28 and 28. First seals 26 and thrust rings 27 are sandwiched between the inner side faces of the stationary bushes 23 and 23 and the end faces of the rotary bush 25, and the stationary bushes 23 and 23 are made to abut at their outer side faces against second seals 29 and thrust rings 30, which are arranged on the outer side ends 28a and 28a of the crawler links 28. Between the inner circumference of a sliding member 24 and the outer circumference of a crawler pin 31, moreover, there is arranged a metallic sliding member 32 having a structure capable of holding a lubricant such as lubricating oil and/or grease.

In the crawler 21 of this embodiment, too, the structure of the metallic sliding member 32 capable of holding the lubricant such as the lubricating oil or the grease can be made like the foregoing embodiment by the method of forming the holes of various shapes in the metallic sliding member 32 or by the method of impregnating the metallic sintered sliding material having 5 to 30 volume % of pores for retaining the gas permeability, with the lubricating oil.

According to this embodiment, the stationary bushes 23 and 23 are press-fitted in the right and left crawler links 28 and 28, and the rotary bush 25 is rotatably fitted between the right and left crawler links 28 and 28. It is, therefore, possible to retain the torsional rigidities of the right and left crawler links 22 and 28. Unlike the structure using only the stationary bushes, moreover, it is possible to avoid the disadvantage that the rotary bush to mesh with the teeth of the drive sprocket is worn at its outer circumference by using the rotary bush.

Here will be described specific Examples of the invention.

EXAMPLE 1

Relations between Crawler Bush—Pin Clearance and Breaking Strength

Figure 10:
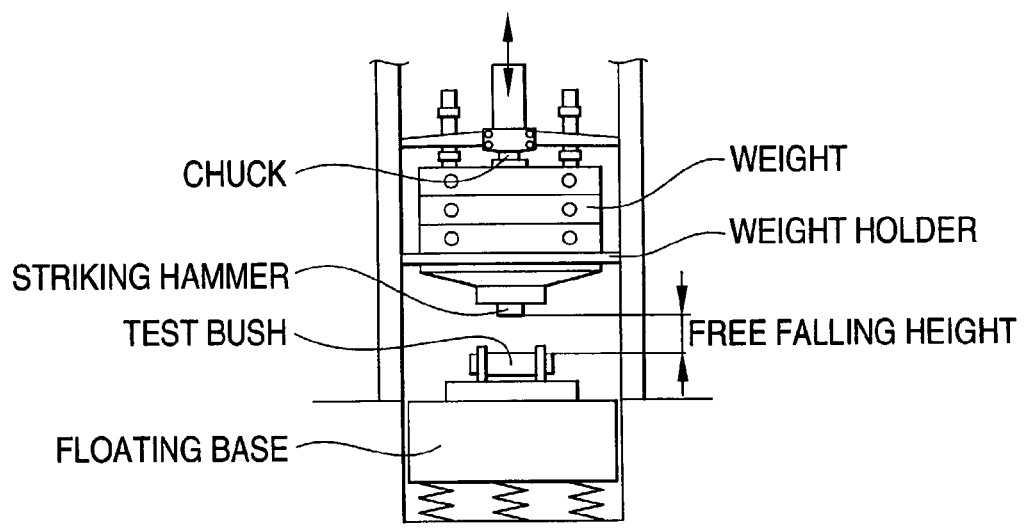
FIG. 10 is a diagram for explaining an impact fatigue testing method.

In this Example, by using a crawler bush having an external diameter of 59.4 mm, an internal diameter of 38.6 mm and a length of 138.5 mm and a crawler pin and by using an impact fatigue testing apparatus shown in FIG. 10, impact fatigue tests were done to examine the influences the clearance between the crawler bush and the crawler pin upon the crawler bush breaking strength and to examine the inserting actions of the metallic sliding member upon the crawler bush breaking strength. Here, the crawler bush was quenched to have a hardened depth of about 3 mm at the HRC45 position by induction-quenching a material SCr440 on both the outer circumference and the inner circumference and was tempered at 180° C. for 3 hrs. On the other hand, the crawler pin was prepared to have a hardened depth of about 4 mm by water-quenching an S45BC material from 850° C. and was tempered at 180° C. for 3 hrs.

Moreover, the impact fatigue tests were executed by adjustments to apply a stress of 1.5 to 4 W with respect to the vehicle body load W (e.g., 18.5 tons) to the inner circumference of the crawler bush.

Figure 11:
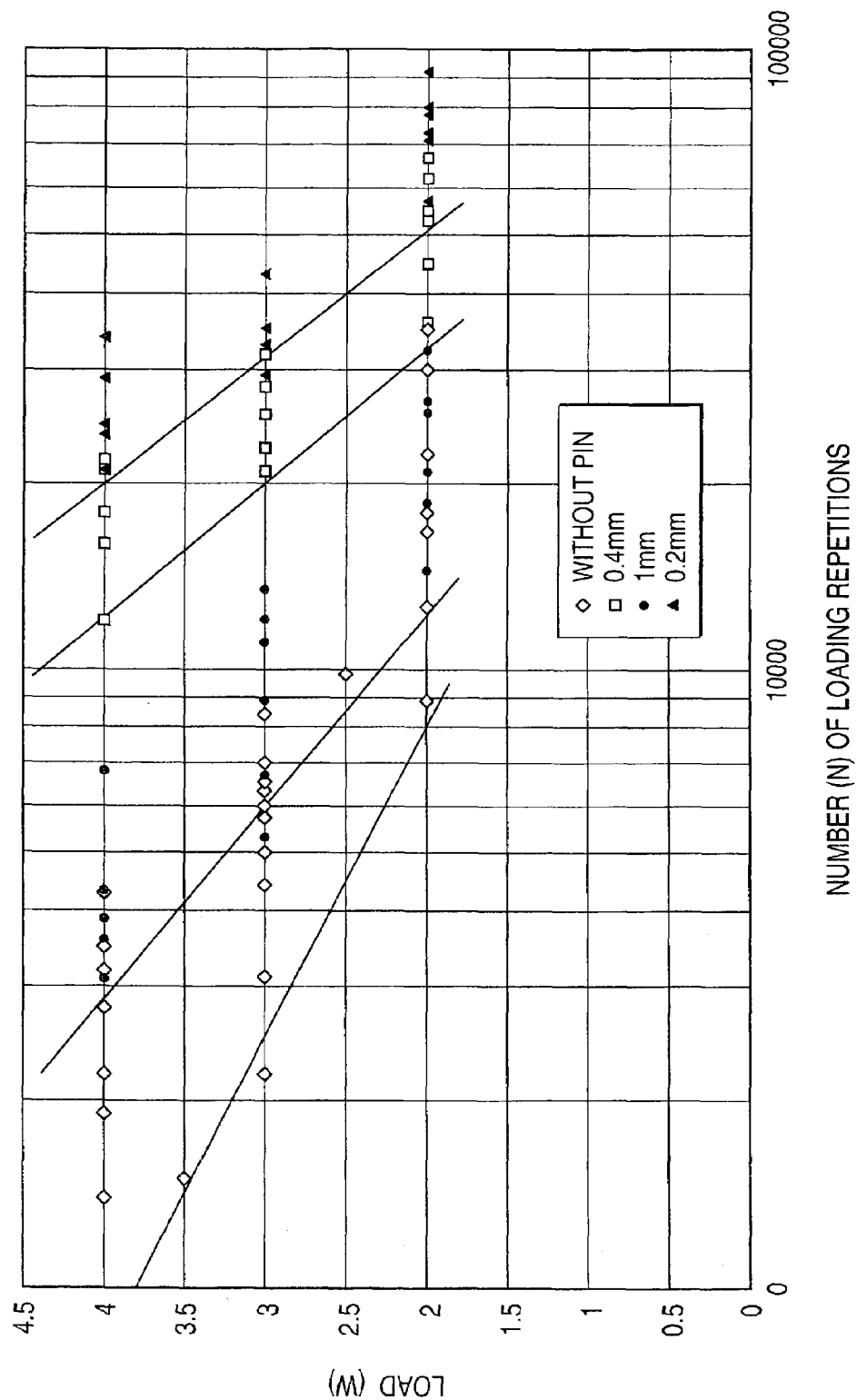
FIG. 11 is a graph (1) plotting relations between a crawler bush-pin clearance and a bush breaking strength.

The results of this Example are plotted in FIG. 11. It has been found that the fatigue strength was improved to about 3 times, 10 times and 20 times as large as that with only the crawler bush in case the clearance between the crawler bush and the crawler pin was set to diametric differences of 1.0 mm, 0.4 mm and 0.2 mm by adjusting the internal diameter of the crawler bush.

Figure 12:
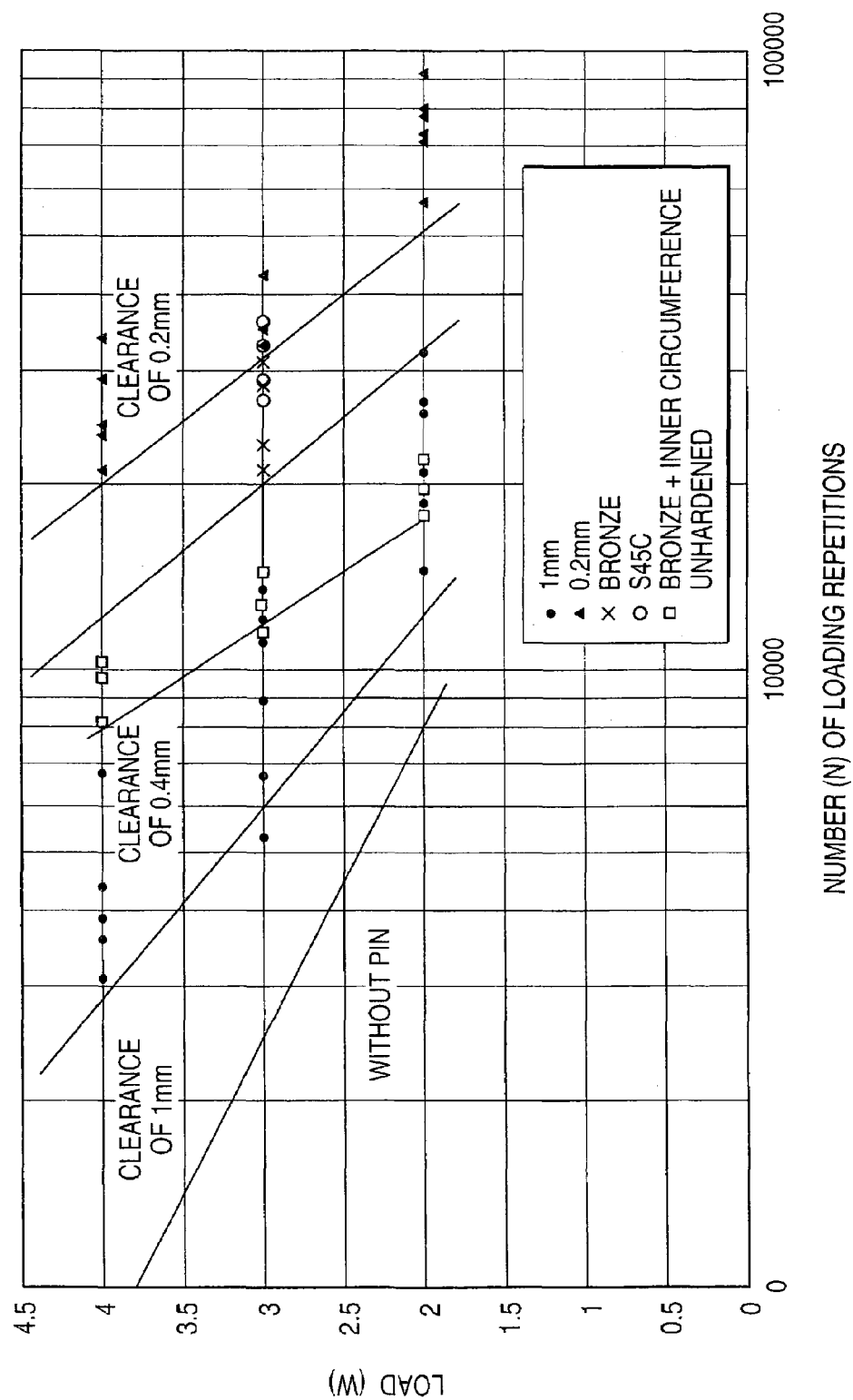
FIG. 12 is a graph (2) plotting relations between the crawler bush-pin clearance and the bush breaking strength.

Moreover, FIG. 12 plots the results which were obtained for the clearance of about 0.2 mm, as reduced in the diametrical difference from 2.0 mm by inserting a sheet member (having a thickness of 0.9 mm) of phosphor bronze (Cu9Sn) and S45C, between the crawler bush and the crawler pin. It is apparent that the breaking strength of the crawler bush was drastically improved by inserting the metallic sliding member.

Here, it has been found that the metallic sliding member. inserted after the impact fatigue tests has a tendency to set under a high load but raises no strength problem, if the test conditions fall at least under the present ones in which the metallic sliding member is inserted into the clearance of the diametrical difference of 2.0 mm between the crawler bush and the crawler pin to about 0.2 mm. Moreover, it is apparent that the clearance after the metallic sliding member was inserted is preferred to be within 1.0 mm in the invention, too, because the clearance of the prior art between the crawler bush and the crawler pin allows 0.4 to 1.2 mm.

For the crawler bush induction-quenched not at its inner circumference but at its outer circumference, still moreover, the impact fatigue tests were made by inserting phosphor bronze (Cu9Sn) having a thickness of 0.9 mm like Example of FIG. 12, and the results are plotted by symbols ☐in FIG. 12. It is found that this crawler bush can be used with no strength problem, as compared with the aforementioned results of the prior art allowing the clearance of 0.4 to 1.2 mm between the crawler bush and the crawler pin.

EXAMPLE 2

Manufacture and Sliding Test Results of CuAl Type Sintered Sheet

Figure 13:
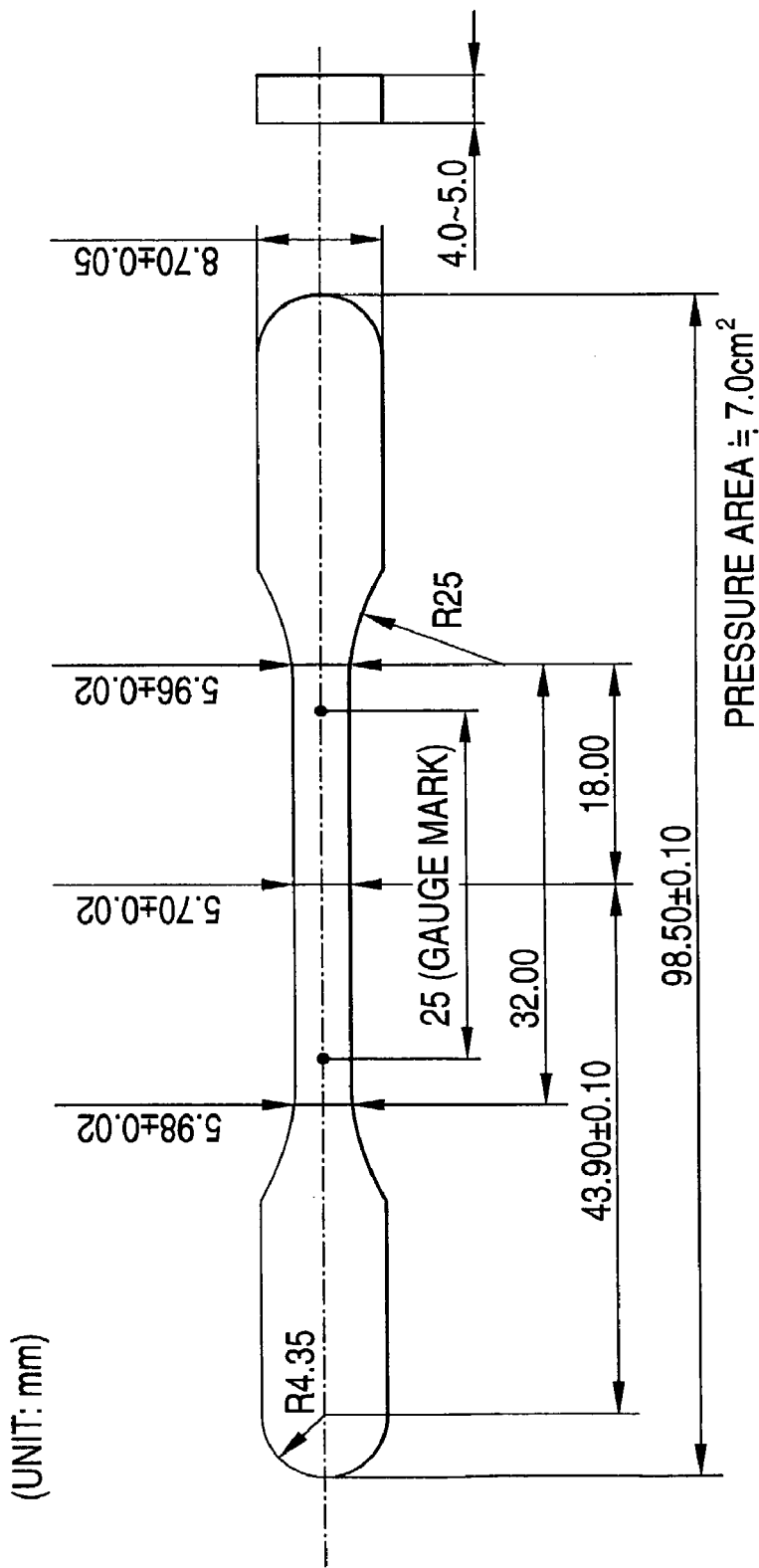
FIG. 13 is a diagram showing a shape of a tension test piece.
Figure 14A:
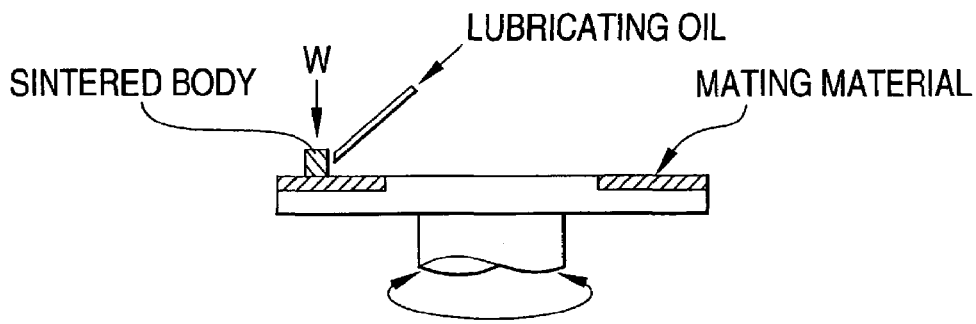
FIGS. 14A and 14B are diagrams showing a conception diagram of a constant speed friction wear tester, and a sliding test piece holder and sliding test conditions.
Figure 14B:
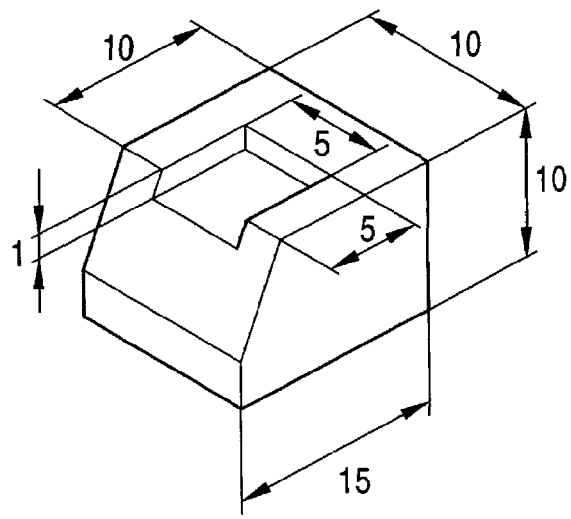
Figure 15:
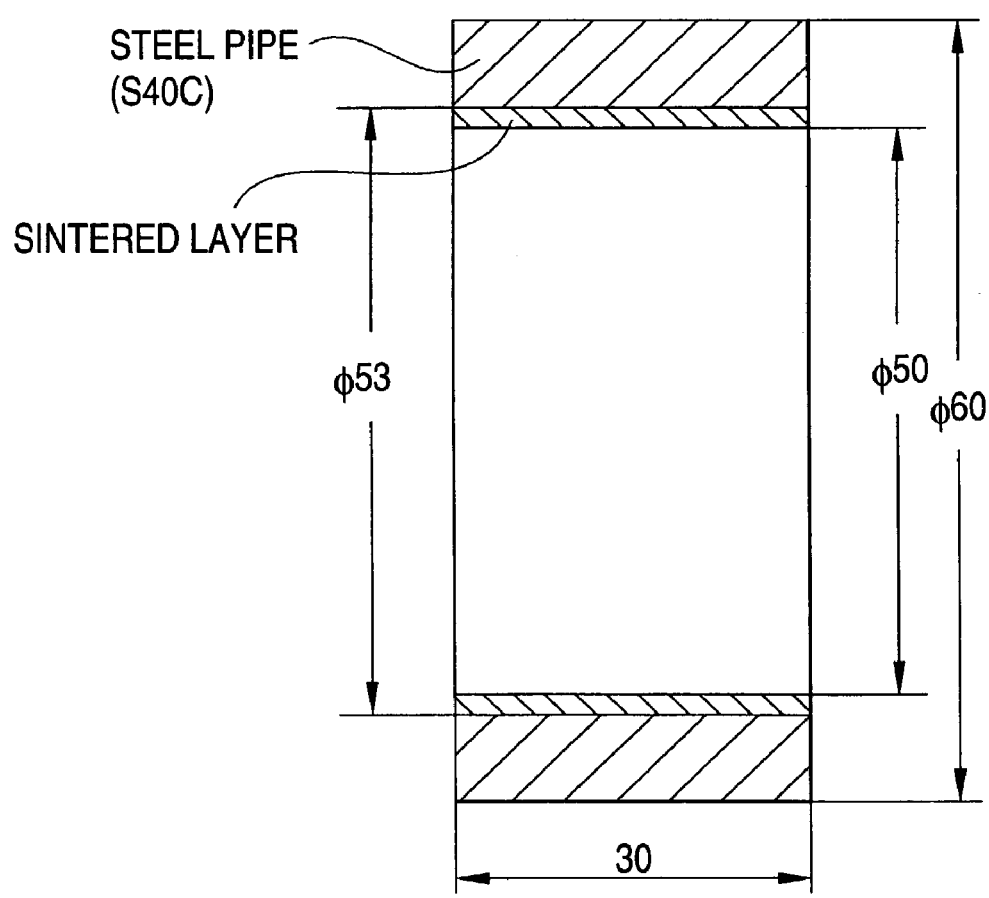
FIG. 15 is a sectional view showing the shape of a test piece subjected to the sliding test.
Figure 17A:
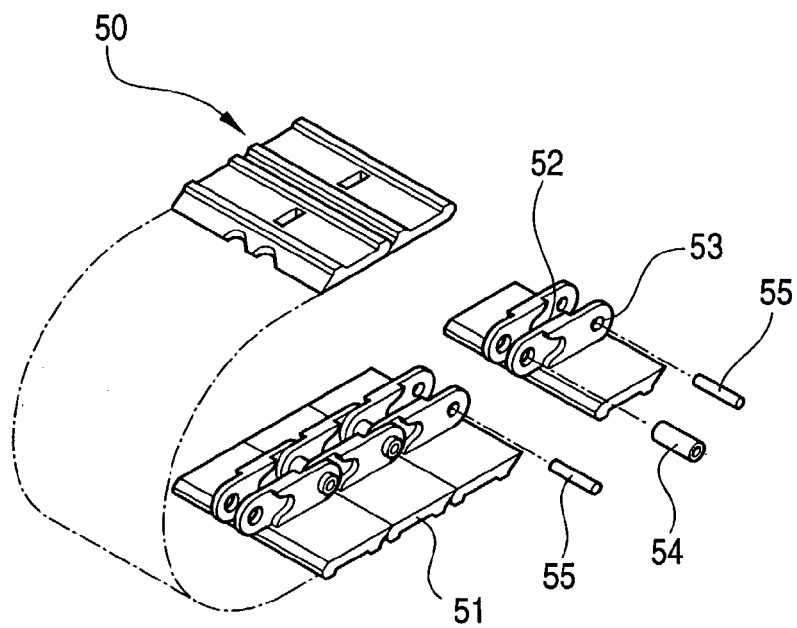
FIGS. 17A and 17B are a perspective view and a sectional view of the crawler.
Figure 17B:
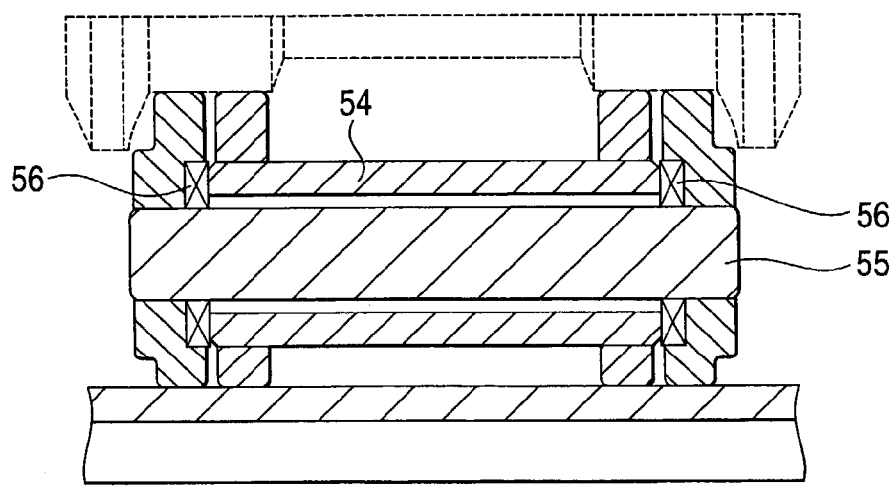
Figure 19:
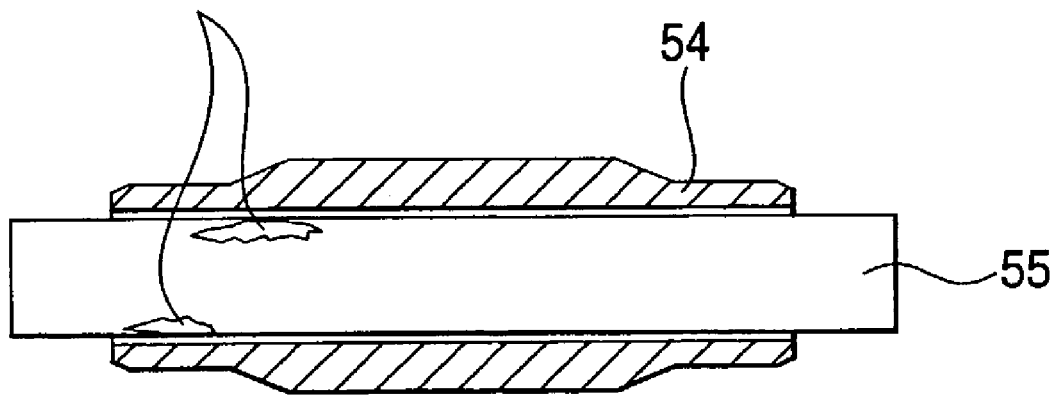
FIG. 19 is a schematic diagram of positions of seizure.
Figure 20:
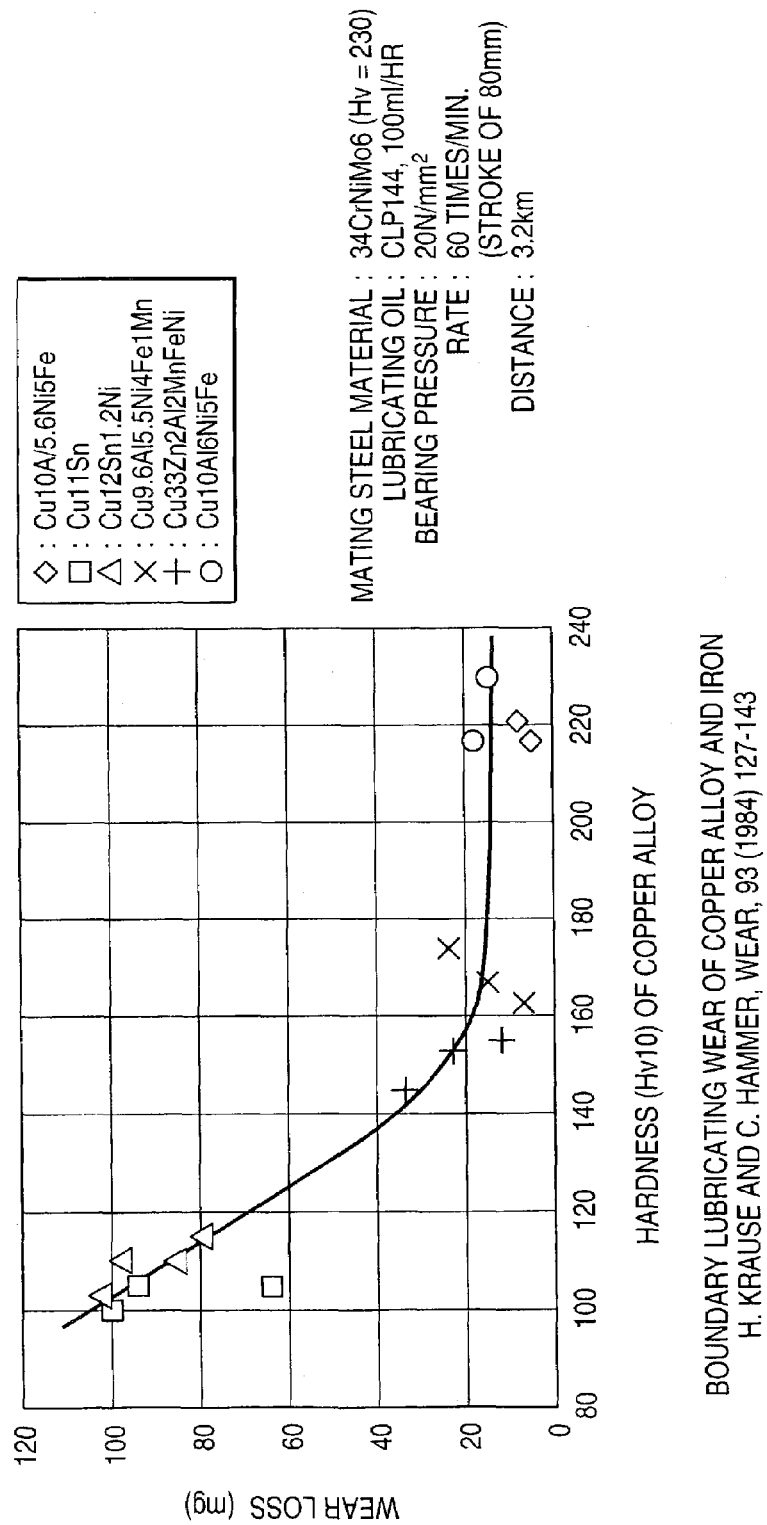
FIG. 20 is a graph plotting a relation of a boundary lubricating wear of copper alloy and iron.

By using Al powder, Sn powder, TiH powder, Si powder, Mn powder, Ni powder, phosphor iron powder and electrolytic cathode copper powder (e.g., CE15 of Fukuda Kinzoku) of 300 meshes or less, mixed powders, as enumerated in Table 1, were molded under a molding pressure of 4 tons/cm$^2$ by using a tensile test piece mold of JIS, as shown in FIG. 13. These test pieces were sintered at a degree of vacuum of 0.01 torrs, at 850, 900 and 960° C., for 1 hr by using a vacuum sintering furnace. After this, the test pieces were rolled within an uncracked range and sintered again at the same temperature for 1 hr. The resultant test pieces (of 2S1R material) were measured on their hardness. Moreover, these materials were measured by the constant rate friction wear testing method on the seizure limit values (i.e., PV values) and the wear losses (ΔW, mm) at that time from the bearing pressure, at which the friction coefficient rises abruptly, and the sliding rate, so that the sliding characteristics were evaluated.

TABLE 1

| No | Cu(CE) | Al | Sn | Ti | Si | Mn | Ni | Fe27P | 2SlR (900) Hv | 2SlR (960) Hv | 2SlR (850) Hv | PV Value | Sliding Characteristics Abrasion Loss(mm) | Sintering Temp | Structure |
|---|---|---|---|---|---|---|---|---|---|---|---|---|---|---|---|
| 1 | Bal. | 7 | 0 | | | | | | 72 | 61 | 79 | 2500 | 0.24 | 900 | α |
| 2 | Bal. | 9 | 0 | | | | | | 84 | 103 | 89 | | | | |
| 3 | Bal. | 10 | 0 | | | | | | 85 | 93 | 94 | 4000 | 0.16 | 900 | α + β |
| 4 | Bal. | 11 | 0 | | | | | | 82 | 99 | 105 | | | | |
| 5 | Bal. | 10 | 3 | | | | | | 67 | 80 | 77 | 7000 | 0.11 | 900 | α + β |
| 6 | Bal. | 10 | 6 | | | | | | 76 | 72 | 75 | 8000 | 0.08 | 900 | β |
| 7 | Bal. | 10 | 9 | | | | | | 63 | | 70 | | | | |
| 8 | Bal. | 4 | 6 | | | | | | 73 | | 72 | 4500 | 0.12 | 900 | α |
| 9 | Bal. | 5 | 6 | | | | | | 57 | | 73 | | | | |
| 10 | Bal. | 6 | 6 | | | | | | 73 | | 69 | 5500 | 0.09 | 900 | α + β |
| 11 | Bal. | 7 | 6 | | | | | | 65 | 80 | 75 | | | | |
| 12 | Bal. | 8 | 6 | | | | | | 78 | 82 | 79 | 8000 | 0.07 | 900 | α + β |
| 13 | Bal. | 2 | 11 | | | | | | 52 | | 80 | | | | |
| 14 | Bal. | 3 | 11 | | | | | | | | 81 | | | | |
| 15 | Bal. | 4 | 11 | | | | | | | | 58 | 4500 | 0.21 | 850 | α |
| 16 | Bal. | 5 | 11 | | | | | | | | 62 | 6000 | 0.09 | 850 | α + β |
| 17 | Bal. | 6 | 11 | | | | | | 77 | | 64 | 7500 | 0.06 | 850 | α + β |
| 18 | Bal. | 7 | | 1 | | | | | 147 | | | 3500 | 0.19 | 900 | α |
| 19 | Bal. | 8 | | 1 | | | | | 151 | | | | | | |
| 20 | Bal. | 9 | | 1 | | | | | 161 | | | | | | |
| 21 | Bal. | 10 | | 1 | | | | | 168 | | | 4000 | 0.07 | 900 | α + β |
| 22 | Bal. | 11 | | 1 | | | | | 162 | | | | | | |
| 23 | Bal. | 12 | | 1 | | | | | 136 | | | | | | |
| 24 | Bal. | 14 | | 1 | | | | | 108 | | | | | | |
| 25 | Bal. | 7 | 3 | | | | | | 136 | | | | | | |
| 26 | Bal. | 9 | 3 | | | | | | 147 | | | | | | |
| 27 | Bal. | 11 | 3 | | | | | | 165 | | | | | | |
| 28 | Bal. | 7 | 3 | 1 | | | | | 162 | | | | | | |
| 29 | Bal. | 9 | 3 | 1 | | | | | 155 | | | 6500 | 0.04 | 900 | α + β |
| 30 | Bal. | 11 | 3 | 1 | | | | | 134 | | | | | | |
| 31 | Bal. | 10 | 3 | 3 | | | | | 138 | 193 | 146 | 7500 | 0.02 | 900 | α + β |
| 32 | Bal. | 10 | 6 | 3 | | | | | 89 | 186 | 96 | 6500 | 0.03 | 900 | β |
| 33 | Bal. | 7 | | 1 | 2 | | | | 110 | | | | | | |
| 34 | Bal. | 9 | | 1 | 2 | | | | 117 | | | | | | |
| 35 | Bal. | 11 | | 1 | 2 | | | | 103 | | | | | | |
| 38 | Bal. | 10 | 3 | 1 | 1 | | | | 82 | 124 | 106 | 8000 | 0.03 | 900 | α + β |
| 37 | Bal. | 10 | 6 | 1 | 1 | | | | 103 | 192 | 67 | 7000 | 0.04 | 900 | β |
| 38 | Bal. | ; | | 1 | | 3 | | | 155 | | | | | | |
| 39 | Bal. | 9 | | 1 | | 3 | | | 157 | | | | | | |
| 40 | Bal. | 11 | | 1 | | 3 | | | 158 | | | | | | |
| 41 | Bal. | 10 | 3 | 1 | | 3 | | | 136 | 159 | 132 | 7500 | 0.02 | 960 | α + β |
| 42 | Bal. | 10 | 6 | 1 | | 3 | | | 121 | 162 | 103 | 6500 | 0.02 | 960 | β |
| 43 | Bal. | ; | | 1 | | | 4 | | 147 | | | | | | |
| 44 | Bal. | 9 | | 1 | | | 4 | | 135 | | | | | | |
| 45 | Bal. | 11 | | 1 | | | 4 | | 138 | | | | | | |
| 46 | Bal. | to | 3 | 1 | | | 3 | | 115 | 155 | 136 | 8000 | 0.01 | 960 | α + β |
| 47 | Bal. | 10 | 6 | 1 | | | 3 | | 88 | 164 | 88 | 7000 | 0.03 | 960 | β |
| 48 | Bal. | 7 | | 1 | | | | 4 | 80 | | | | | | α |
| 49 | Bal. | 9 | | 1 | | | | 4 | 73 | | | | | | |
| 50 | Bal. | '11 | | 1 | | | | 4 | 73 | | | | | | |
| 51 | Bal. | 10 | 3 | 1 | | | | 3 | 79 | 79 | 59 | 7000 | 0.02 | 960 | α + β |
| 52 | Bal. | 10 | 6 | 1 | | | | 3 | 82 | 113 | 61 | 6500 | 0.04 | 960 | β |
| 53 | Bal. | 5 | 0 | 1 | | | | | 150 | | | 4500 | 0.08 | 900, 5 min | α |
| 54 | Bal. | 5 | 3 | 1 | | | | | 169 | 3S2R | | 6500 | 0.02 | 900, 5 min | α + β |
| 55 | Bal. | 5 | 3 | 1 | | 2 | | | 157 | | | | | 900, 5 min | α |

TABLE 2

| No | Cu | Fe | Al | Sn | Ti | C | Hardness | Structure | Limit Bearing Pressure kg/cm² |
|---|---|---|---|---|---|---|---|---|---|
| 1 | Bal. | | 7 | | 1 | | 130 | α | 550 |
| 2 | Bal. | 5 | | 3 | 1 | | 170 | α + β | 700 |
| 3 | Bal. | | 10 | | 1 | 1 | 165 | α + β | 850 |
| 4 | Bal. | | 10 | 3 | 3 | 1 | 200 | α + β | 1000 |
| 5 | Bal. | | 10 | 5 | 3 | | 230 | β | 1000 |
| 6 | Bat | | | 9.4 | | | 110 | α bronze oil | 300 |
| 7 | Bal. | | | 11 | 1 | | 120 | α phosphor bronze molten lumbering impregnated bearing | 400 |

TABLE 2-continued

| No | Cu | Fe | Al | Sn | Ti | C | Hardness | Structure | Limit Bearing Pressure kg/cm² |
|---|---|---|---|---|---|---|---|---|---|
| 8 | 15 | Bal. | | | | 0.8 | 600 | Fe | 250 |
| 9 | S45C | | | | | | 550 | Martensite | 150 |

What is claimed is:

1. A crawler comprising a cylindrical crawler bush surface-hardened on its outer circumference or on its outer circumference and its inner circumference; a crawler pin arranged on the inner circumference of said crawler bush; and a metal member formed of at least one layer arranged in a clearance formed between said crawler bush and said crawler pin,
   wherein said at least one layer of said metal member is a metallic sliding member having a structure capable of holding lubricating oil and/or a lubricant, said crawler pin outer circumference or said crawler bush inner circumference is grooved, and said metallic sliding member to be used is shaped to have a contour along the groove shape, so that the metallic sliding member is prevented from axially coming out from the clearance formed between the crawler bush and the crawler pin when the crawler runs.

2. A crawler according to claim 1, wherein side faces of the crawler link, on which ends of said crawler pin are press-fitted, act as stoppers.

3. A crawler according to claim 1, wherein said metallic sliding member is either press-fitted or fitted on said crawler bush inner circumference or fitted on said crawler pin outer circumference.

4. A crawler bush according to claim 3, further comprising seal devices mounted on the inner circumference near the two ends of the crawler in which said metallic sliding member is press-fitted or fitted in said crawler bush inner circumference.

* * * * *